(12) United States Patent
Igeta et al.

(10) Patent No.: US 8,493,533 B2
(45) Date of Patent: Jul. 23, 2013

(54) LIQUID CRYSTAL DISPLAY DEVICE

(75) Inventors: Koichi Igeta, Chiba (JP); Osamu Nagashima, Mobara (JP)

(73) Assignees: Hitachi Displays, Ltd., Chiba-ken (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 213 days.

(21) Appl. No.: 12/805,112

(22) Filed: Jul. 13, 2010

(65) Prior Publication Data

US 2010/0277681 A1  Nov. 4, 2010

Related U.S. Application Data

(62) Division of application No. 12/230,426, filed on Aug. 28, 2008, now abandoned.

(30) Foreign Application Priority Data

Aug. 30, 2007  (JP) ................................ 2007-224106

(51) Int. Cl.
*G02F 1/1337* (2006.01)
(52) U.S. Cl.
USPC ........................... 349/126; 349/132; 349/146
(58) Field of Classification Search
None
See application file for complete search history.

(56) References Cited

U.S. PATENT DOCUMENTS

| 6,147,722 | A | 11/2000 | Shimada et al. |
| 7,119,869 | B2 | 10/2006 | Kim et al. |
| 7,206,054 | B2 * | 4/2007 | Kim ............................. 349/144 |
| 7,924,352 | B2 * | 4/2011 | Hsiao et al. ..................... 349/37 |
| 2003/0227591 | A1 * | 12/2003 | Liu et al. ....................... 349/143 |
| 2004/0233343 | A1 | 11/2004 | Baek |
| 2005/0140893 | A1 * | 6/2005 | Hong ............................ 349/139 |
| 2005/0168665 | A1 | 8/2005 | Ina et al. |

FOREIGN PATENT DOCUMENTS

| JP | 10-104664 | 4/1998 |
| JP | 2004-246280 | 9/2004 |
| JP | 2004-348130 | 12/2004 |

* cited by examiner

*Primary Examiner* — Sarah Hahm
(74) *Attorney, Agent, or Firm* — Stites & Harbison PLLC; Juan Carlos A. Marquez; Nicholas B. Trenkle

(57) ABSTRACT

Light leakage between pixel electrodes over a video signal line in a TN-type liquid crystal display device in which a dot inversion driving is applied with a three o'clock viewing angle is prevented. Pixel electrodes (PX) are formed on both sides of a video signal line (DL) of a first substrate (SUB1), and an end of the pixel electrode (PX) and the video signal line (DL) overlap each other. Over a second substrate (SUB2), a black matrix (BM) is formed in a portion corresponding to the video signal line (DL). By shifting the black matrix BM and the video signal line DL to the left with respect to a gap G between the pixel electrodes PX, it is possible to prevent light leakage caused by a disclination line (DS) which occurs by a horizontal electric field between pixel electrodes (PX).

6 Claims, 31 Drawing Sheets

FIG.9A
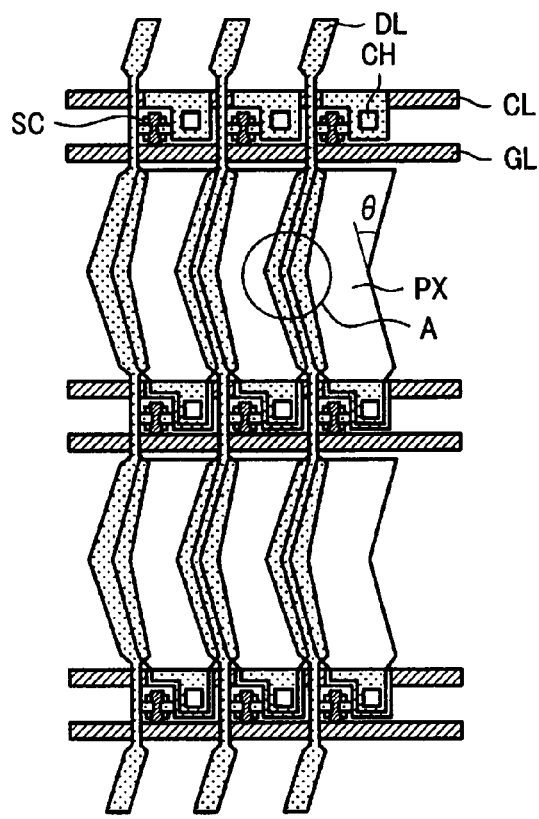
FIG.9B
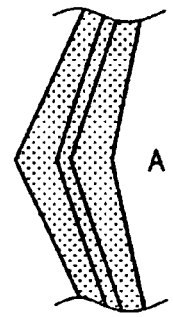
FIG.9C  FIG.9D
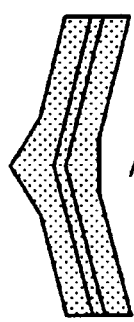 
FIG.9E
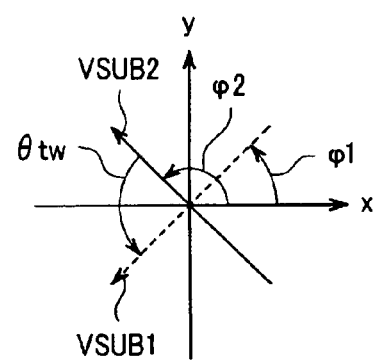

θ tw= φ2−φ1=225−135=90 (°)

$\theta tw = \varphi 2 - \varphi 1 = 135 - 45 = 90 \ (°)$ $\theta tw = \varphi 2 - \varphi 1 = -135 - (-45) = -90 \ (°)$ $\theta tw = \varphi 2 - \varphi 1 = -45 - (-135) = 90 \ (°)$ $\theta\, tw = \varphi 2 - \varphi 1 = 45 - 135 = -90\ (°)$

LIQUID CRYSTAL DISPLAY DEVICE

CROSS-REFERENCE TO RELATED APPLICATIONS

This application is a Divisional of U.S. application Ser. No. 12/230,426 filed on Aug. 28, 2008 now abandoned. Priority is claimed based on U.S. application Ser. No. 12/230,426 filed on Aug. 28, 2008, which claims priority from Japanese application 2007-224106 filed on Aug. 30, 2007, the content of which is hereby incorporated by reference into this application.

BACKGROUND OF THE INVENTION

1. Field of the Invention

The present invention relates to a liquid crystal display device, and, in particular, to a liquid crystal display device having a countermeasure to a light leakage in a dot-inversion driving method or in a column inversion driving method.

2. Description of the Related Art

In a liquid crystal display device, a first substrate on which pixel electrodes, thin film transistors (hereinafter referred to as "TFT"), etc. are formed in a matrix form and a second substrate on which color filters or the like are formed at positions corresponding to the pixel electrodes oppose each other, and liquid crystal is provided between the first substrate and the second substrate. A transmittance of light by the liquid crystal molecules is controlled for each pixel, to form an image.

Over the first substrate, a video signal line which extends along a vertical direction and which is arranged along a horizontal direction and a scan signal line which extends along the horizontal direction and which is arranged along the vertical direction are provided, and a pixel is formed in a region surrounded by the video signal line and the scan signal line. The pixel primarily comprises a pixel electrode and a thin film transistor (TFT) which is a switching element. A display region is formed with a plurality of pixels formed in a matrix form.

Driving methods of the liquid crystal display device include a frame inversion driving method, a line inversion driving method, a dot inversion driving method, a column inversion driving method, etc. Of these methods, the dot inversion driving method is superior in image quality, and, thus, is used in a monitor or a television of middle or greater sizes. Among liquid crystal display modes, a TN method is most widely in use. In the liquid crystal display element of TN method, positive type liquid crystal molecules aligned parallel to the substrate are twisted by 90 degrees between two opposing substrates, and the alignment of the liquid crystal molecules are switched between horizontal and vertical with respect to the substrate by switching an electric field ON and OFF, so that the optical rotation state of the light is changed and brightness and darkness are displayed. Although the TN-type devices are easily manufactured, there is a disadvantage such as a narrow viewing angle.

In the TN method, on the other hand, a phenomenon of disturbance of the alignment of the liquid crystal or a reverse tilt domain may occur at the periphery of the pixel electrode. Such an alignment disturbance or reverse tilt domain leads to light leakage from a backlight, resulting in a reduction in contrast. As a countermeasure for these phenomena, there are known JP 2004-246280 A and JP 10-104664 A. In addition, JP 2004-348130 A discloses that, in VA-type liquid crystal display devices in which the liquid crystal is aligned in a vertical direction of the substrate, alignment of the liquid crystal at the periphery of the pixel may be disturbed and texture and light leakage may occur because of an electric field in the horizontal direction which is generated between adjacent pixels sandwiching the video signal line.

SUMMARY OF THE INVENTION

In the TN-type device, when the device is viewed from a particular direction, an index of refraction of the liquid crystal molecule rapidly changes, and a phenomenon occurs where the colorscale is inverted, that is, the color tone of the image is inverted. Because of this, normally, a direction which is less frequently used is set as the direction of colorscale inversion. For example, in a monitor of a notebook PC or the like, the upper direction (direction of twelve o'clock) is set as the direction in which colorscale inversion tends to occur and the lower direction (direction of six o'clock) is set as a direction in which colorscale inversion does not tend to occur, or, an opposite configuration is employed in which the lower direction (direction of six o'clock) is set as the direction in which colorscale inversion tends to occur and the upper direction (direction of twelve o'clock) is set as the direction in which the colorscale inversion does not tend to occur.

In most usages of the liquid crystal display devices, the direction in which the colorscale inversion tends to occur is set at the twelve o'clock direction or the six o'clock direction, similar to a PC. In this case, the viewing angle is symmetric in the horizontal direction; that is, in the three o'clock and nine o'clock directions. By attaching a viewing angle expansion film on a polarizer plate, the viewing angle can be expanded. However, in some usages, the direction in which the colorscale inversion tends to occur is set at the three o'clock direction or the nine o'clock direction. In this case, the initial alignment state of the liquid crystal molecules is set, for example, differing from the extension direction of the video signal line by 90 degrees.

In the above-described driving method, with regard to potentials of adjacent pixels, while the potentials of the pixels adjacent along the extension direction of the scan line always have the same polarity in the frame inversion driving method and in the line inversion driving method, the potentials of pixels adjacent along the extension direction of the scan line always have opposite polarities in the dot inversion driving method and in the column inversion driving method. In other words, when one of the pixels has a positive polarity, the other one of the adjacent pixels have a negative polarity. Therefore, a horizontal electric field would always be applied between the adjacent pixels. Because the horizontal electric field disturbs the desired alignment of the liquid crystal molecules, that is, the horizontal electric field disturbs the alignment by the vertical electric field, a light leakage occurs during black display.

This phenomenon is significant when the direction in which colorscale inversion tends to occur is in the three o'clock direction or in the nine o'clock direction. An object of the present invention is to provide a structure in which light leakage does not occur during black display, in particular, when a liquid crystal display device having a direction in which the colorscale inversion tends to occur at a three o'clock direction or in a nine o'clock direction is driven through the dot inversion driving method or the column inversion driving method.

The present invention achieves at least the object described above, and provides:

(1) a TN-type liquid crystal display device in which liquid crystal is provided between a first substrate and a second substrate, a rubbing process is applied to the first substrate and the second substrate so that a colorscale inversion does not tend to occur in a three o'clock direction or in a nine o'clock direction, and a dot inversion driving or a column inversion driving is applied, wherein, over the first substrate, a first pixel electrode and a second pixel electrode are placed sandwiching a video signal line along the three o'clock direction or the nine o'clock direction with a spacing therebetween, the video signal line overlaps the first pixel electrode and the second pixel electrode, and an amount of overlap between the video signal line and the first pixel electrode is larger than an amount of overlap between the video signal line and the second pixel electrode, a light-shielding film is formed over the second substrate, the light-shielding film overlaps the first pixel electrode and the second pixel electrode, and an amount of overlap between the light-shielding film and the first pixel electrode is larger than an amount of overlap between the light-shielding film and the second pixel electrode, and the light-shielding film extends to an outer position of the video signal line on a side of the first pixel electrode, and the video signal line extends to an outer position of the light-shielding film on a side of the second pixel electrode;

(2) the liquid crystal display device according to (1), wherein a reverse tilt domain occurs on the side of the first pixel electrode, and the reverse tilt domain is covered by the video signal line and the light-shielding film;

(3) a TN-type liquid crystal display device in which liquid crystal is provided between a first substrate and a second substrate, a rubbing process is applied to the first substrate and the second substrate so that a colorscale inversion does not tend to occur in a three o'clock direction or in a nine o'clock direction, and a dot inversion driving or a column inversion driving is applied, wherein, over the first substrate, video signal lines extend, as a whole, along a first direction which is parallel to a twelve o'clock direction and are arranged in a second direction which is parallel to the three o'clock direction, scan lines extend along the second direction and are arranged in the first direction, and a pixel including a pixel electrode is formed in a region surrounded by the video signal line and the scan line, the video signal line and the pixel electrode are bent within the pixel, an angle between a side of the bent pixel electrode and the first direction is greater than or equal to 10 degrees and less than or equal to 45 degrees in a clockwise direction on one side of the bent portion and is greater than or equal to 15 degrees and less than or equal to 45 degrees in a counterclockwise direction on the other side of the bent portion when the liquid crystal is twisted in the counterclockwise direction from the second substrate toward the first substrate, and the angle is greater than or equal to 15 degrees and less than or equal to 45 degrees in the clockwise direction on the one side of the bent portion and is greater than or equal to 10 degrees and less than or equal to 45 degrees in the counterclockwise direction on the other side of the bent portion when the liquid crystal is twisted in the clockwise direction from the second substrate toward the first substrate, and the pixel electrode and the video signal line overlap each other, and an amount of the overlap is larger in the bent portion of the video signal line than in the other portions;

(4) the liquid crystal display device according to (3), wherein the angle between the side of the bent pixel electrode and the first direction is greater than or equal to 10 degrees and less than or equal to 25 degrees in the clockwise direction on the one side of the bent portion and is greater than or equal to 15 degrees and less than or equal to 25 degrees in the counterclockwise direction on the other side of the bent portion when the liquid crystal is twisted in the counterclockwise direction from the second substrate toward the first substrate and the angle is greater than or equal to 15 degrees and less than or equal to 25 degrees in the clockwise direction on the one side of the bent portion and is greater than or equal to 10 degrees and less than or equal to 25 degrees in the counterclockwise direction on the other side of the bent portion when the liquid crystal is twisted in the clockwise direction from the second substrate toward the first substrate;

(5) a TN-type liquid crystal display device in which liquid crystal is provided between a first substrate and a second substrate, a rubbing process is applied to the first substrate and the second substrate so that a colorscale inversion does not tend to occur in a three o'clock direction or in a nine o'clock direction, and a dot inversion driving or a column inversion driving is applied, wherein, over the first substrate, video signal lines extend, as a whole, along a first direction which is parallel to a twelve o'clock, direction and are arranged in a second direction which is parallel to the three o'clock direction, scan lines extend along the second direction and are arranged in the first direction, and a pixel including a pixel electrode is formed in a region surrounded by the video signal line and the scan line, and the pixel electrode and the video signal line overlap each other, the video signal line and the pixel electrode are tilted within the pixel in a same direction with respect to the first direction, an angle formed by sides of the video signal line and the pixel electrode with the first direction is greater than or equal to 10 degrees and less than or equal to 45 degrees in a clockwise direction or is greater than or equal to 15 degrees and less than or equal to 45 degrees in a counterclockwise direction when the liquid crystal is twisted in the counterclockwise direction from the second substrate toward the first substrate and the angle is greater than or equal to 15 degrees and less than or equal to 45 degrees in the clockwise direction or is greater than or equal to 10 degrees and less than or equal to 45 degrees in the counterclockwise direction when the liquid crystal is twisted in the clockwise direction from the second substrate toward the first substrate;

(6) the liquid crystal display device according to (5), wherein the angle formed by the sides of the video signal line and the pixel electrode with the first direction is greater than or equal to 10 degrees and less than or equal to 25 degrees in the clockwise direction when the liquid crystal is twisted in the counterclockwise direction from the second substrate toward the first substrate and the angle is greater than or equal to 10 degrees and less than or equal to 25 degrees in the counterclockwise direction when the liquid crystal is twisted in the clockwise direction from the second substrate toward the first substrate;

(7) the liquid crystal display device according to (5), wherein the angle formed by the sides of the video signal line and the pixel electrode with the first direction is greater than or equal to 15 degrees and less than or equal to 25 degrees in the counterclockwise direction when the liquid crystal is twisted in the counterclockwise direction from the second substrate toward the first substrate and the angle is greater than or equal to 15 degrees and less than or equal to 25 degrees in the clockwise direction when the liquid crystal is twisted in the clockwise direction from the second substrate toward the first substrate; and (8) the liquid crystal display device according to any one of (1)-(7), wherein an anisotropy of dielectric constant of the liquid crystal is less than or equal to 6 and greater than zero.

According to a first aspect of the present invention, in a structure in which light leakage by alignment disturbance is prevented by the video signal line and the light-shielding film, a side in which a reverse tilt domain occurs is effectively light-shielded and the positional relationship between the video signal line and the light-shielding film is set considering the formation precision of the pattern and the positioning precision of the substrate, and, thus, a TN-type liquid crystal display device driven by the dot inversion driving method or the column inversion driving method which is bright and which has a superior contrast can be obtained.

According to another aspect of the present invention, because the pixel electrode and the video signal line are bent within a pixel, alignment disturbance such as the reverse tilt domain can be reduced, and the amount of overlap between the video signal line and the pixel electrode can be reduced. With such a structure, a TN-type liquid crystal display device driven by the dot inversion driving method or the column inversion driving method which is bright and which has a superior contrast can be obtained.

According to yet another aspect of the present invention, by tilting the pixel electrode and the video signal line in the same direction within a pixel and specifying the tilting angle, it is possible to reduce alignment disturbance such as the reverse tilt domain, and the amount of overlap between the video signal line and the pixel electrode for preventing the light leakage can be reduced. With such a structure, a TN-type liquid crystal display device driven by the dot inversion driving method or the column inversion driving method which is bright and which has a superior contrast can be obtained.

BRIEF DESCRIPTION OF THE DRAWINGS

FIGS. 9A, 9B, 9C, 9D, and 9E are plan views showing a third preferred embodiment according to the present invention.

DETAILED DESCRIPTION OF THE INVENTION

Figure 19:
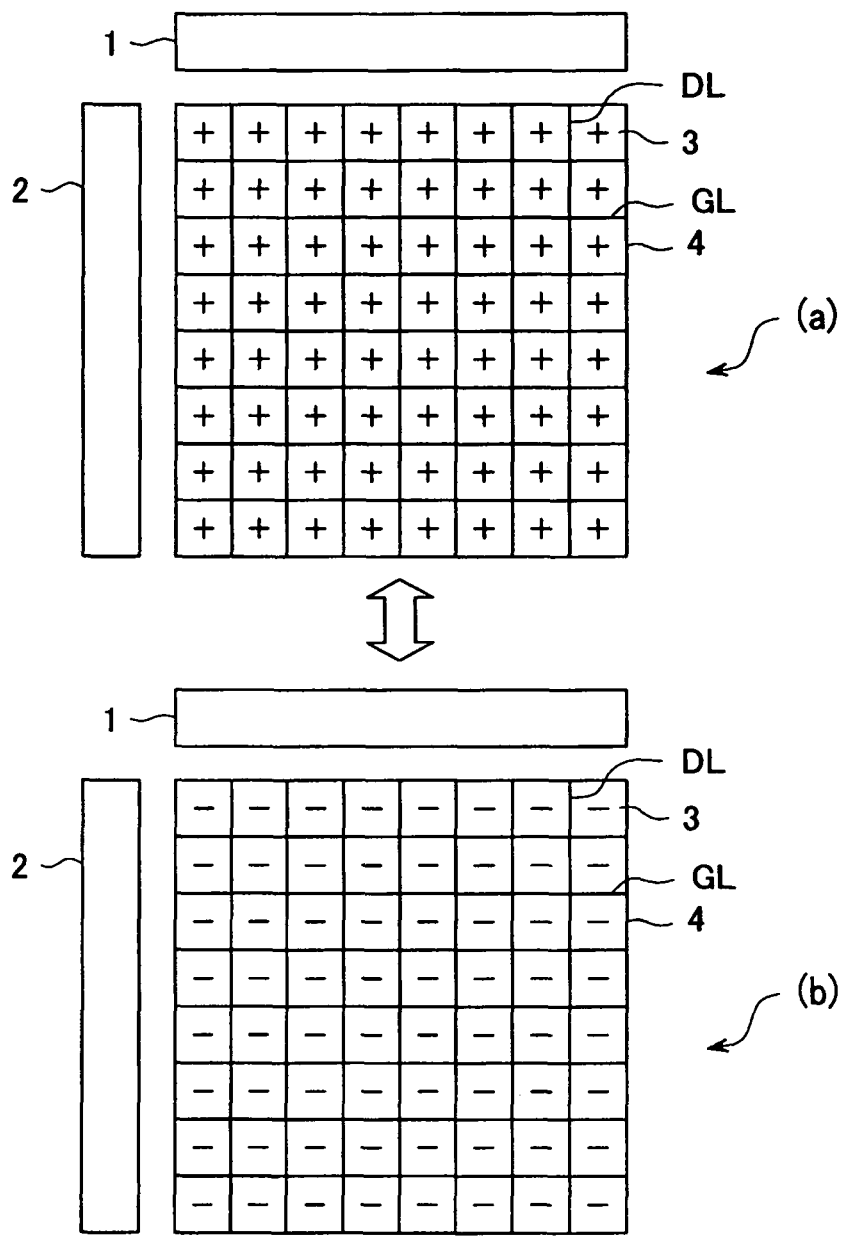
FIG. 19 is an operation diagram of a frame inversion driving method.

A problem when a dot inversion driving method or a column inversion driving method is employed in a configuration having a direction in which the colorscale inversion tends to occur being a three o'clock direction or a nine o'clock direction will first be described. FIG. 19 is a schematic diagram of a driving method with frame inversion driving. In FIG. 19, (a) represents a first frame and (b) represents a second frame. In (a), a display region 4 comprises a plurality of pixels 3 which are arranged in a matrix form. Each pixel 3 is defined by a video signal line DL extending along a vertical direction and a scan line GL extending along a horizontal direction.

A video signal line driving circuit 1 is formed above the display region 4 and a scan line driving circuit 2 is formed at the left of the display region 4. In the first frame represented in (a), a positive signal potential with respect to the common electrode formed over a second substrate SUB2 is applied in each pixel 3. In the second frame represented in (b), a negative signal potential with respect to the common electrode is applied in each pixel 3. In such a driving method, because signals of a same polarity are applied to pixels 3 which are adjacent to each other over the video signal line DL, the alignment disturbance does not occur.

Figure 20:
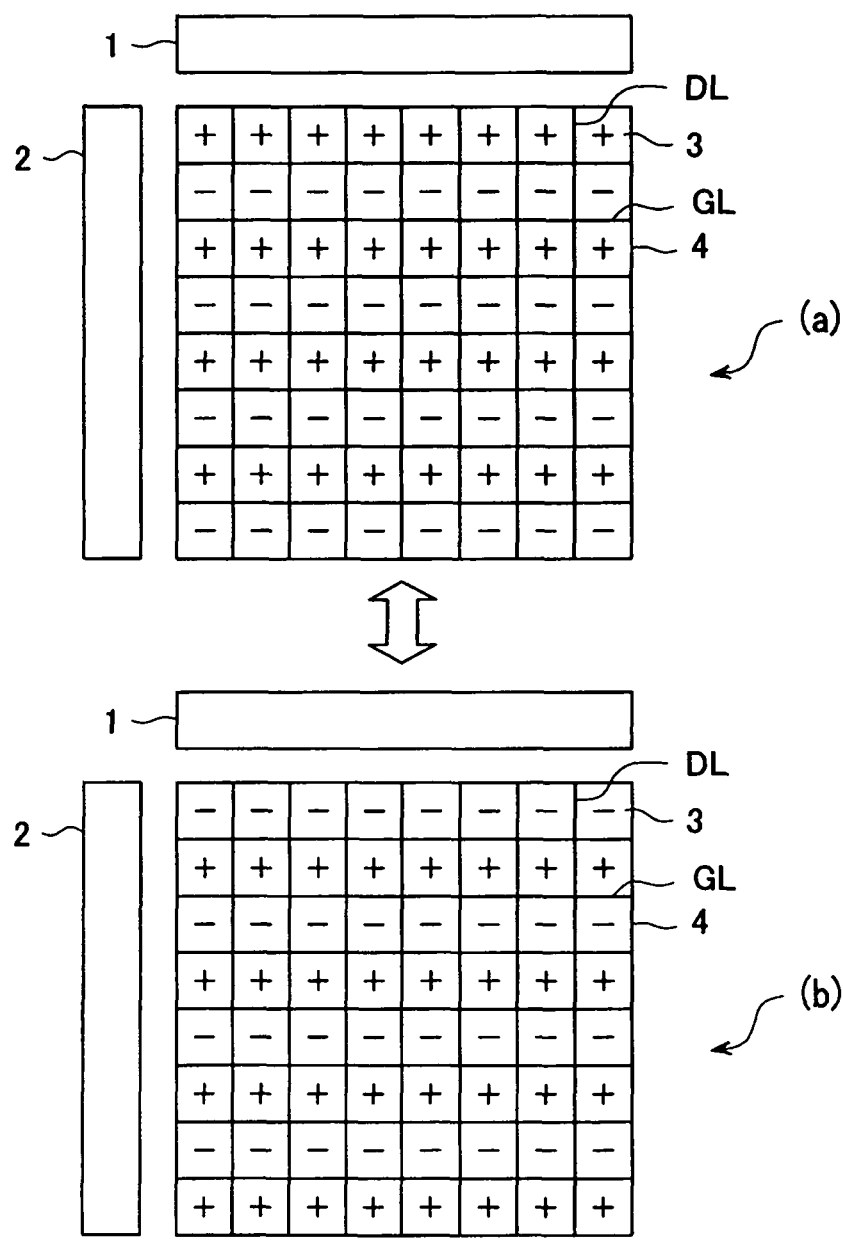
FIG. 20 is an operation diagram of a line inversion driving method.

FIG. 20 is a schematic diagram of a line inversion driving method. In FIG. 20, (a) represents a first frame and (b) represents a second frame. The arrangement of the pixels 3, the placement of the video signal line driving circuit 1, and the placement of the scan line driving circuit 2 are similar to those in FIG. 19. In the first frame represented by (a), a positive or negative signal with respect to the common electrode formed over the second substrate SUB2 is applied, alternately for different scan lines GL, in the pixels 3. In the second frame represented by (b) also, a positive or negative signal is applied, alternately for different scan line GL, but the positions of the positive and negative are alternated from (a). This is why this driving method is called line inversion. In the case of line inversion also, because signals of the same polarity are applied to pixels 3 adjacent to each other over the video signal line DL, the alignment disturbance does not occur.

Figure 21:
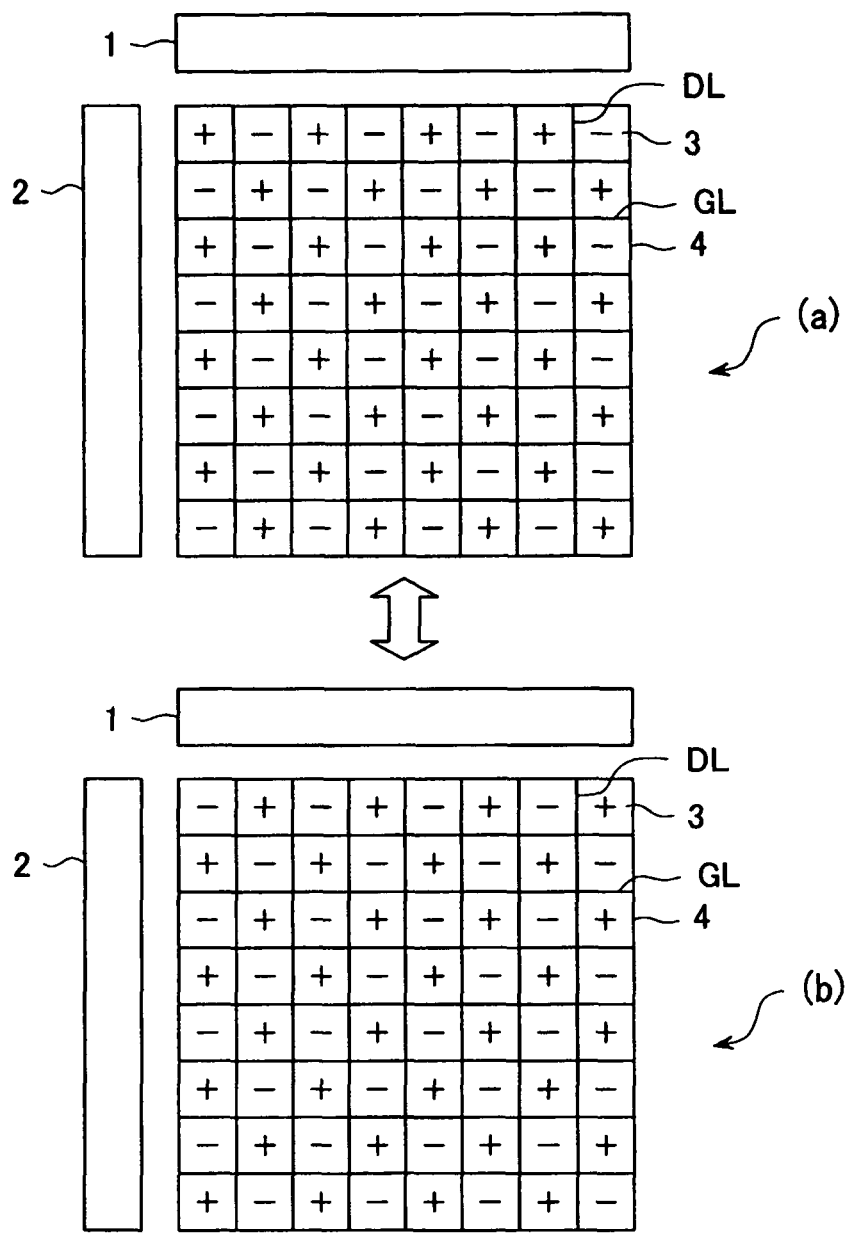
FIG. 21 is an operation diagram of a dot inversion driving method.

FIG. 21 is a schematic diagram showing a dot inversion driving method. In FIG. 21, (a) represents a first frame and (b) represents a second frame. The arrangement of the pixels 3, the placement of the video signal line driving circuit 1, and the placement of the scan line driving circuit 2 are similar to those of FIG. 19. In the first frame represented by (a), a signal potential with respect to the common electrode formed over the second substrate SUB2 is inverted for each pixel 3. In the second frame represented by (b) also, the signal potential is inverted for each pixel 3, but the positions of the positive and negative are alternated from the first frame. In both the first frame and the second frame, when the same scan line GL is considered, signals of potentials of opposite polarities are applied to pixels 3 adjacent to each other over the video signal line DL. Therefore, an electric field in the horizontal direction is generated between pixels 3 adjacent to each other over the video signal line DL, and the alignment disturbance occurs. The alignment disturbance consequently causes light leakage.

Figure 22:
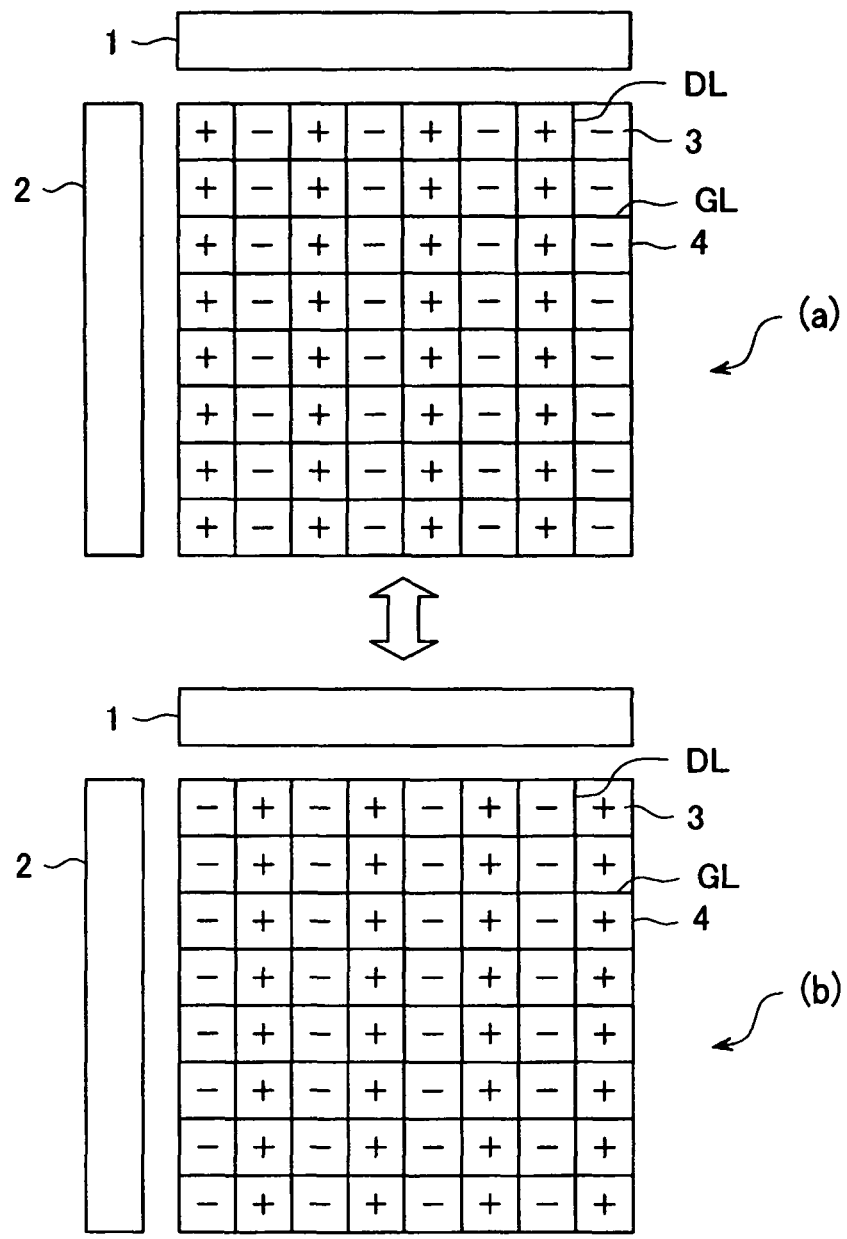
FIG. 22 is an operation diagram of a column inversion driving method.

FIG. 22 is a schematic view of a column inversion driving method. In FIG. 22, (a) represents a first frame and (b) represents a second frame. The arrangement of the pixels 3, the placement of the video signal line driving circuit 1, and the placement of the scan line driving circuit 2 are similar to FIG. 19. In the first frame represented by (a), the signal potential with respect to the common electrode formed over the second substrate SUB2 is inverted alternately for each column. In the second frame represented in (b) also, the signal potential is inverted for each column, but the positions of positive and negative are alternated from the first frame. In both the first frame and the second frame, similar to the dot inversion, when the same scan line GL is considered, signals of potentials of opposite polarities are applied to the pixels 3 adjacent to each other over the video signal line DL. Therefore, an electric field in the horizontal direction is generated between pixels 3 adjacent to each other over the video signal line DL, and alignment disturbance occurs. The alignment disturbance consequently causes light leakage. In the following description, the problem and countermeasure in the case of dot inversion will be described, but similar problem and countermeasure apply to the case of the column inversion.

Definitions of the terms used in the following description are as follows.

"Twelve o'clock viewing angle" means a configuration in which the colorscale inversion does not tend to occur in the twelve o'clock direction and the colorscale inversion tends to occur in the six o'clock direction, "six o'clock viewing angle" means a configuration in which the colorscale inversion does not tend to occur in the six o'clock direction and the colorscale inversion tends to occur in the twelve o'clock direction, "three o'clock viewing angle" means a configuration in which the colorscale inversion does not tend to occur in a three o'clock direction and the colorscale inversion tends to occur in a nine o'clock direction, and "nine o'clock viewing angle" means a configuration in which the colorscale inversion does not tend to occur in the nine o'clock direction and the colorscale inversion tends to occur in the three o'clock direction. Here, the "three o'clock direction" refers to a direction between two o'clock and four o'clock and does not include two o'clock and four o'clock. The "nine o'clock direction" refers to a direction between eight o'clock and ten o'clock and does not include eight o'clock and ten o'clock. The other directions are similarly defined.

Figure 23:
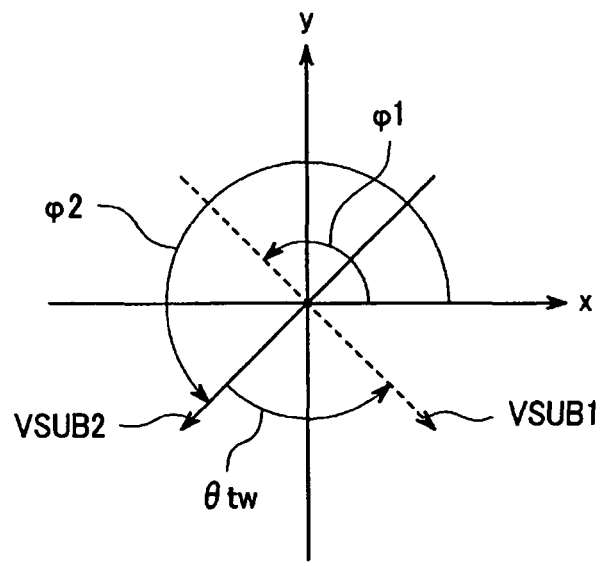
FIG. 23 shows a liquid crystal alignment axis which achieves a twelve o'clock viewing angle.

FIG. 23 is a diagram showing a relationship of alignment direction of the liquid crystal of a first substrate SUB1 and the second substrate SUB2 in the case of the twelve o'clock viewing angle. Specifically, in FIG. 23, the colorscale inversion does not tend to occur in the twelve o'clock direction and the colorscale inversion tends to occur in the six o'clock direction. The alignment directions of the liquid crystal on the substrates, that is, the alignment vectors are determined by the rubbing directions of the substrates. In FIG. 23, an arrow of a solid line represents an alignment vector VSUB2 of the second substrate SUB2 (in a direction opposite to the rubbing direction) and an arrow of a dotted line represents an alignment vector VSUB1 of the first substrate SUB1 (in a same direction as the rubbing direction). The alignment vector VSUB2 of the second substrate SUB2 is at 225 degrees from the x-axis and the alignment vector VSUB1 of the first substrate SUB1 is at 135 degrees from the x-axis. A twist angle θtw of the liquid crystal molecules is 90 degrees in the counterclockwise direction from the second substrate SUB2 toward the first substrate SUB1. An absorption axis of the polarizer plate is matched with a direction of major axis of the liquid crystal molecules.

Figure 24:
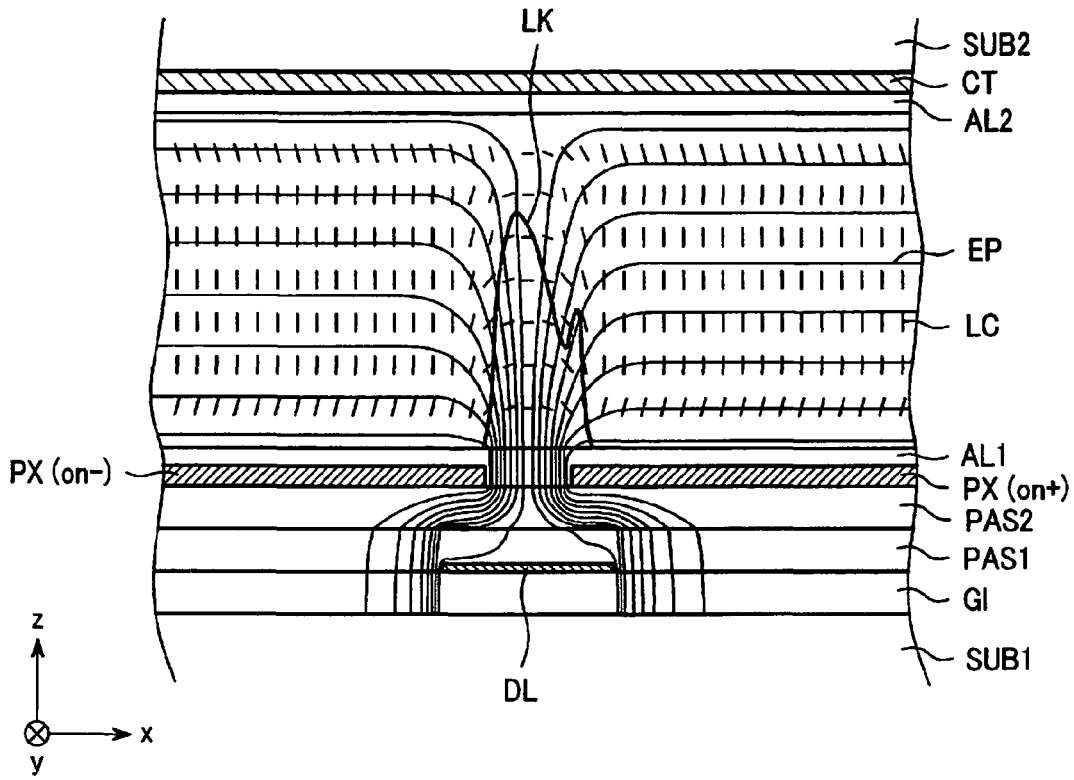
FIG. 24 shows alignment disturbance in the case of dot inversion driving with a twelve o'clock viewing angle.

FIG. 24 is a diagram showing an alignment of the liquid crystal in a dot inversion driving method with the twelve o'clock viewing angle. In FIG. 24, a gate insulating film GI, a video signal line DL, a first passivation film (first insulating film) PAS1, and a second passivation film (second insulating film) PAS2 are formed over the first substrate SUB1 and a pixel electrode PX is formed over the second passivation film PAS2. A positive potential with respect to the potential on an opposing electrode CT formed over the second substrate SUB2 is applied to the pixel electrode PX on the right and a negative potential with respect to the potential on the opposing electrode CT is applied to the pixel electrode PX on the left. In the plan view, a periphery of the pixel electrode PX overlaps with the video signal line DL. A lower alignment film AL1 is formed over the pixel electrode PX.

The opposing electrode CT and an upper alignment film AL2 are formed on the side of the second substrate SUB2. In FIG. 24, a black matrix (light-shielding film) BM, a color filter CF, etc. on the side of the second substrate SUB2 are not shown. A liquid crystal layer LC is provided between the first substrate SUB1 and the second substrate SUB2. FIG. 24 shows an ON state and the liquid crystal molecules are aligned in the vertical direction over the pixel electrode PX. At the periphery of the pixel electrode PX, however, because voltages having different polarities with respect to the potential on the opposing electrode CT are applied to pixel electrodes PX adjacent to each other over the video signal line DL, a horizontal electric field is generated. An equipotential line EP as shown in FIG. 24 is present between the pixel electrodes PX.

Due to the horizontal electric field at the periphery of the pixel electrode, the alignment of the liquid crystal molecules is disturbed. More specifically, because liquid crystal molecules are aligned in the horizontal direction along the horizontal electric field in a region between the pixel electrodes PX, light cannot be blocked, and a brightness distribution, that is, a light leakage LK occurs. In this case, however, because the light from the backlight is blocked by the video signal line DL, the light leakage does not actually occur.

Figure 25:
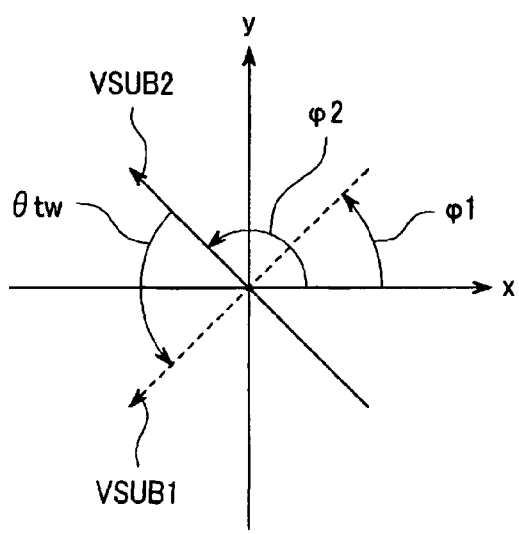
FIG. 25 shows a liquid crystal alignment axis which achieves a three o'clock viewing angle.

However, a problem occurs in the case of the three o'clock viewing angle as shown in FIG. 25. In FIG. 25, the colorscale inversion does not tend to occur in the three o'clock direction and the colorscale inversion tends to occur in the nine o'clock direction. FIG. 25 is a diagram showing a relationship of the alignment directions of the liquid crystal on the first substrate SUB1 and the second substrate SUB2 in the case of the three o'clock viewing angle. The alignment directions of the liquid crystal on the substrates, that is, the alignment vectors are determined by the rubbing directions of the substrates. In FIG. 25, an arrow of a solid line represents an alignment vector VSUB2 (in a direction opposite to the rubbing direction) of the second substrate SUB2 and an arrow of a dotted line represents an alignment vector VSUB1 (in the same direction as the rubbing direction) of the first substrate SUB1. The alignment vector VSUB2 of the second substrate SUB2 is at 135 degrees from the x-axis and the alignment vector VSUB1 of the first substrate SUB1 is at 45 degrees from the x-axis. The liquid crystal molecules are twisted by 90 degrees in the counterclockwise direction from the second substrate SUB2 toward the first substrate SUB1. An absorption axis of the polarizer plate is matched with the direction of the major axis of the liquid crystal molecules.

Figure 26:
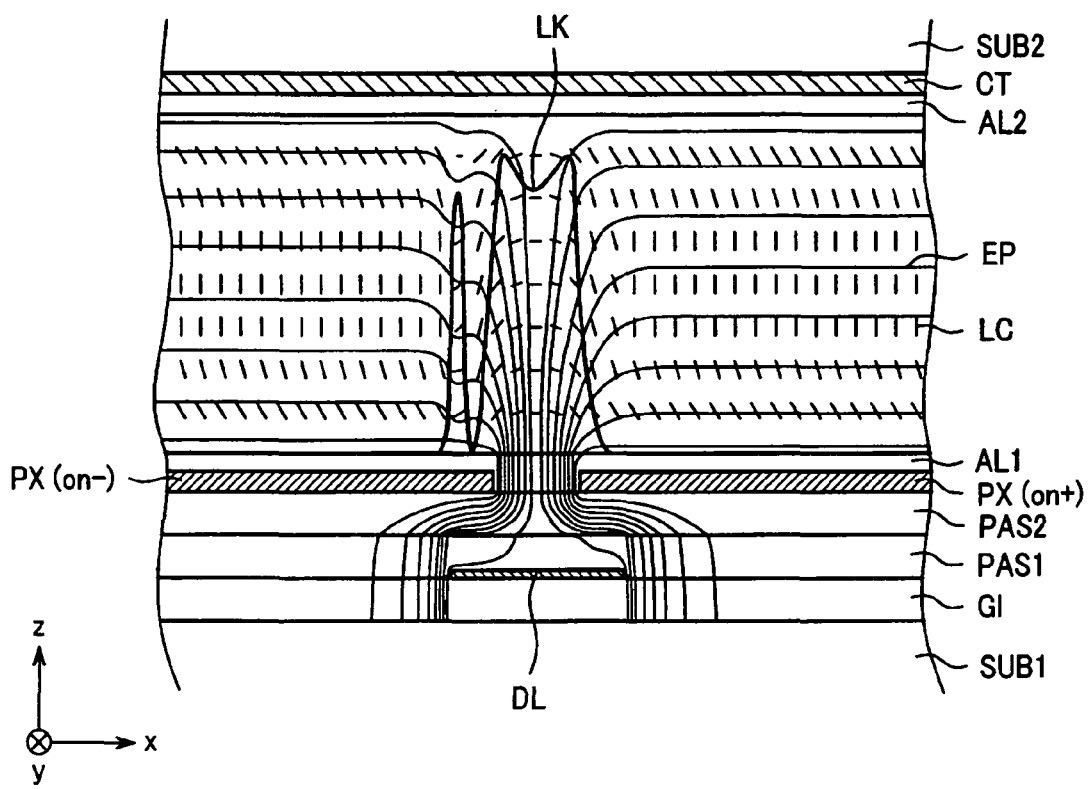
FIG. 26 shows alignment disturbance in the case of dot inversion driving with a three o'clock viewing angle.

FIG. 26 is a diagram showing alignment of the liquid crystal in dot inversion driving with the three o'clock viewing angle. The structure of the liquid crystal display device is similar to the structure described with reference to FIG. 23. FIG. 26 shows an ON state, and the liquid crystal molecules are aligned in the vertical direction over the pixel electrode PX. In FIG. 26, a negative potential with respect to the potential on the opposing electrode CT is applied to the pixel on the left and a positive potential with respect to the potential on the opposing electrode CT is applied to the pixel on the right. Therefore, a horizontal electric field is generated at the periphery of the pixel and the alignment of the liquid crystal is disturbed.

In the case of the twelve o'clock viewing angle of the above-described example configuration of FIG. 24, because the liquid crystal molecules near the center along the thickness direction of the liquid crystal layer LC are aligned in the twelve o'clock direction in the initial state in which no voltage is applied to the liquid crystal layer LC, the liquid crystal molecules are not easily affected by the horizontal electric field due to the elasticity of the liquid crystal molecules. In the case of the three o'clock viewing angle shown in FIG. 26, however, the liquid crystal molecules near the center along the thickness direction of the liquid crystal layer LC is aligned in the three o'clock direction even in the initial alignment state in which no voltage is applied to the liquid crystal layer LC. Therefore, when a pixel voltage is applied, the liquid crystal molecules are easily affected by the horizontal electric field generated between the pixel electrodes PX.

As described, the brightness distribution between pixel electrodes PX, that is, the light leakage LK is larger in the case of the three o'clock viewing angle than in the case of the twelve o'clock viewing angle. In particular, a portion in which the liquid crystal molecules are tilted upward in the opposite direction (reverse tilt domain) occurs at the periphery of the pixel electrode PX on the left, and the brightness becomes large in this portion, resulting in a disclination line. Because the disclination line occurs at an outer position than the video signal line DL, the disclination line cannot be covered with the video signal line DL, and, thus, the disclination line becomes a light leakage and degrades the contrast.

Figure 27:
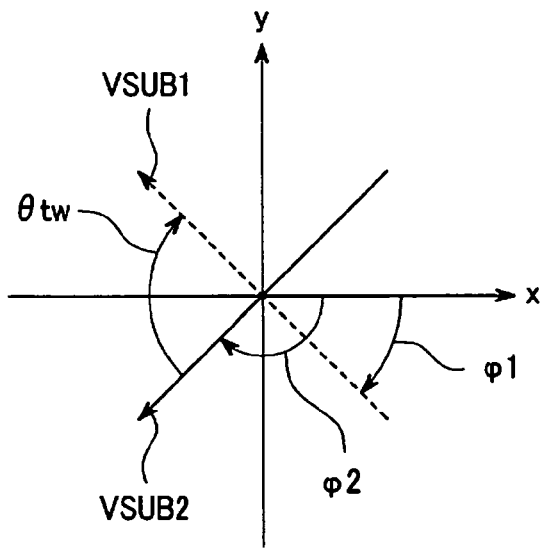
FIG. 27 shows another structure which achieves a three o'clock viewing angle.

A structure of an alignment vector which results in the three o'clock viewing angle has been described with reference to FIG. 25. The structure of alignment vector which results in the three o'clock viewing angle is not limited to the structure of FIG. 25, and may alternatively be, for example, a structure as shown in FIG. 27. In FIG. 27, an arrow of a solid line represents an alignment vector VSUB2 (in a direction opposite to the rubbing direction) of the second substrate SUB2 and an arrow of a dotted line represents an alignment vector VSUB1 (in the same direction as the rubbing direction) of the first substrate SUB1. The alignment vector VSUB2 of the second substrate SUB2 is at −135 degrees from the x-axis and the alignment vector VSUB1 of the first substrate SUB1 is at −45 degrees from the x-axis. The liquid crystal molecules are twisted in the clockwise direction by 90 degrees from the second substrate SUB2 toward the first substrate SUB1. The absorption axis of the polarizer plate is matched with the direction of the major axis of the liquid crystal molecules. In the structure of the three o'clock viewing angle of FIG. 27 also, a problem similar to that described with reference to FIG. 26 occurs.

Figure 28:
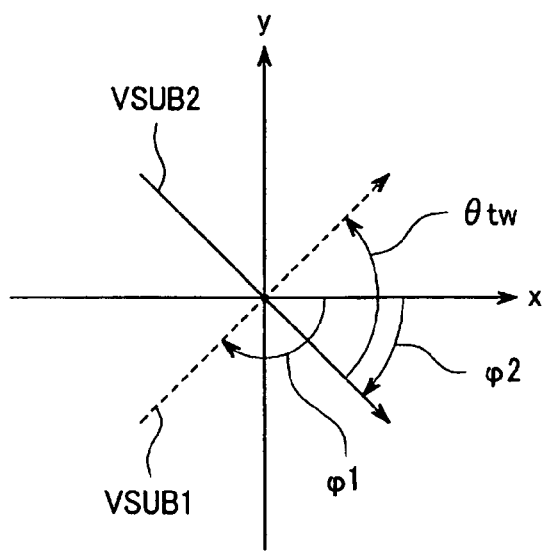
FIG. 28 shows a liquid crystal alignment axis which achieves a nine o'clock viewing angle.

A problem in the case of the three o'clock viewing angle has been described. In the case of the nine o'clock viewing angle, a problem similar to the case of the three o'clock viewing angle occurs. FIG. 28 is a diagram showing an example of an alignment vector which achieves the nine o'clock viewing angle. In FIG. 28, an arrow of a solid line represents an alignment vector VSUB2 (in a direction opposite to the rubbing direction) of the second substrate SUB2 and an arrow of a dotted line represents an alignment vector VSUB1 (in the same direction as the rubbing direction) of the first substrate SUB1. The alignment vector VSUB2 of the second substrate SUB2 is at −45 degrees from the x-axis and the alignment vector VSUB1 of the first substrate SUB1 is at −135 degrees from the x-axis. The liquid crystal molecules are twisted by 90 degrees in the counterclockwise direction from the second substrate SUB2 toward the first substrate SUB1.

Figure 29:
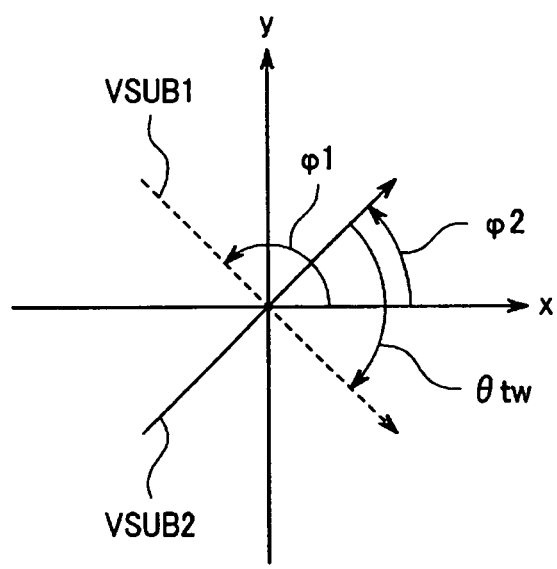
FIG. 29 shows another structure which achieves a nine o'clock viewing angle.

FIG. 29 shows another example structure of the alignment vector for achieving the nine o'clock viewing angle. In FIG. 29, an arrow of a solid line represents an alignment vector VSUB2 (in a direction opposite to the rubbing direction) of the second substrate SUB2 and an arrow of a dotted line represents an alignment vector VSUB1 (in the same direction as the rubbing direction) of the first substrate SUB1. The alignment vector VSUB2 of the second substrate SUB2 is at 45 degrees from the x-axis and the alignment vector VSUB1 of the first substrate SUB1 is at 135 degrees from the x-axis. The liquid crystal molecules are twisted by 90 degrees in the clockwise direction from the second substrate SUB2 toward the first substrate SUB1. With the alignment vectors of the case of the nine o'clock viewing angle as shown in FIGS. 28 and 29 also, similar to the case of the three o'clock viewing angle, light leakage occurs due to the disclination line. In the case of the nine o'clock viewing angle, a portion in which the liquid crystal molecules are tilted upward in the opposite direction occurs at a periphery of the pixel electrode PX on the right. The position where the disclination line occurs is on the opposite side compared the case of the three o'clock viewing angle. Other properties are basically identical to the case of the three o'clock viewing angle.

Figure 30A:
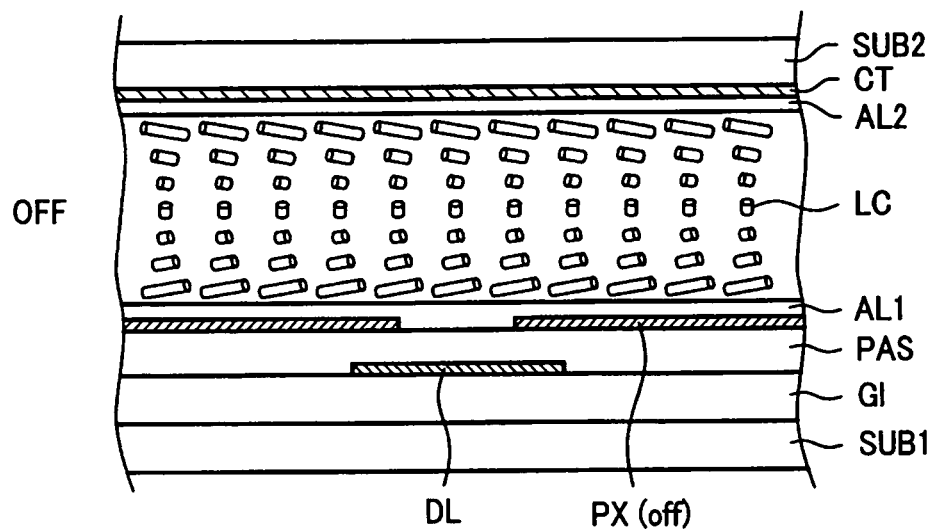
FIGS. 30A and 30B are schematic diagrams of frame inversion driving with a twelve o'clock viewing angle.
Figure 30B:
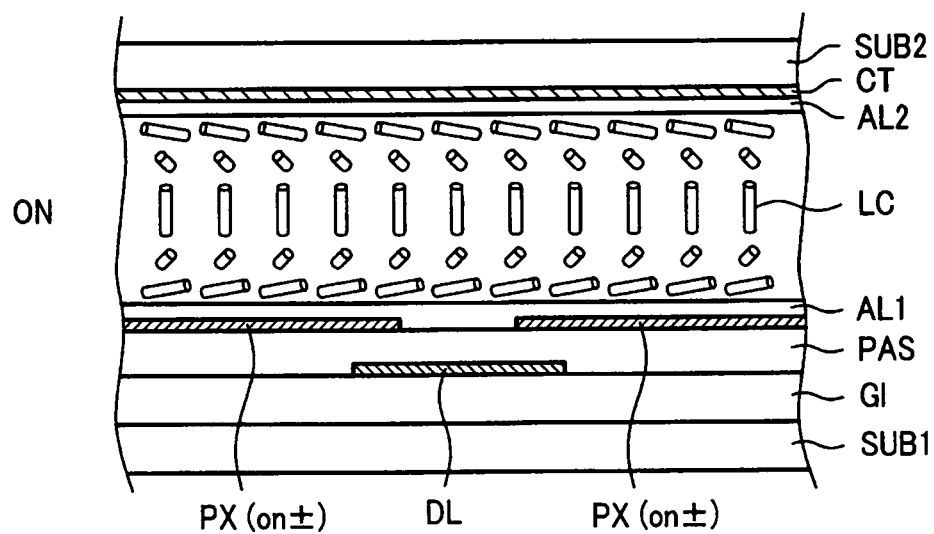

A relationship between the driving method and the viewing angle will now be described below. FIGS. 30A and 30B are schematic operational diagrams in the case of frame inversion driving with the twelve o'clock viewing angle. In FIGS. 30A and 30B, the reference numerals of the constituting elements are similar to those in FIG. 24. The black matrix BM, the color filter CF, etc. over the second substrate SUB2 are not shown. The first passivation film PAS1 and the second passivation film PAS2 are collectively shown as a passivation film PAS. These similarly apply to figures up to FIGS. 33A and 33B. FIG. 30A shows an OFF state, and the liquid crystal molecules are aligned approximately in a horizontal direction. FIG. 30B shows an ON state. Because the driving method is frame inversion driving, no electric field is generated between pixels adjacent to each other over the video signal line DL. Therefore, the alignment disturbance at the periphery of the pixel does not occur.

Figure 31A:
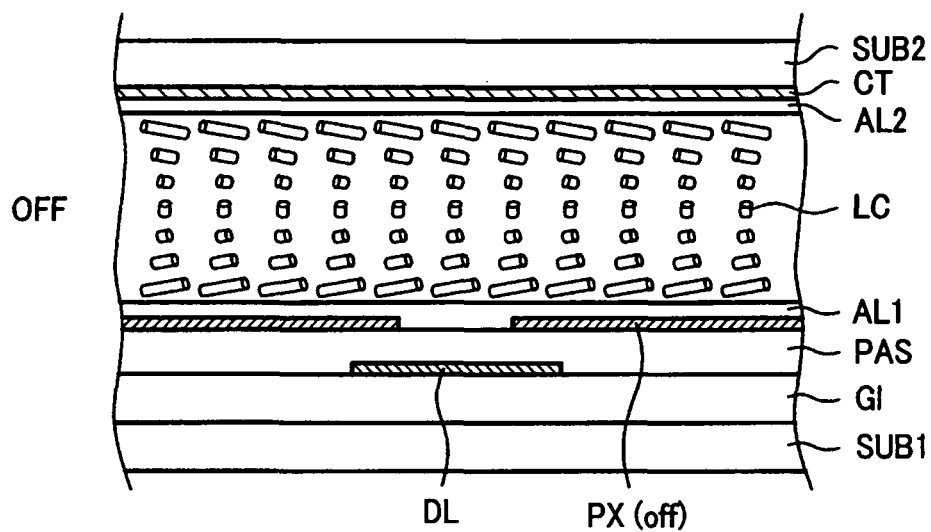
FIGS. 31A and 31B are schematic diagrams of dot inversion driving with a twelve o'clock viewing angle.
Figure 31B:
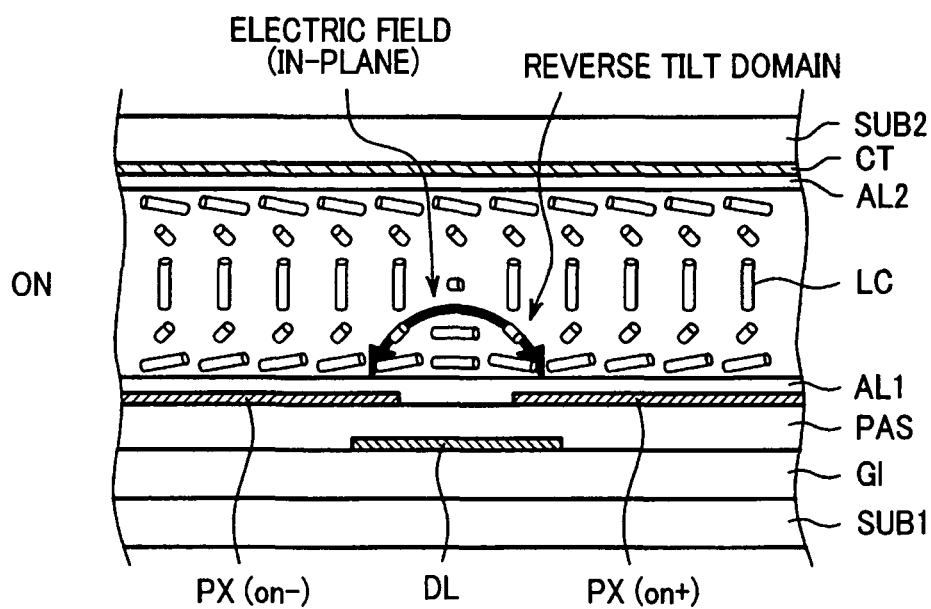

FIGS. 31A and 31B are schematic operational diagrams of dot inversion driving with the twelve o'clock viewing angle. FIG. 31A shows an OFF state, and the liquid crystal molecules are aligned approximately in the horizontal direction. FIG. 31B shows an ON state. Because the driving method is dot inversion driving, voltages having polarities which differ from each other are applied to pixels on both sides of the video signal line DL. In FIG. 31B, a negative potential with respect to the potential on the opposing electrode CT is applied to the pixel at the left and a positive potential with respect to the potential on the opposing electrode CT is applied to the pixel at the right.

In this state, near the center in the thickness direction of the liquid crystal layer LC, the liquid crystal molecules are aligned in the vertical direction over the pixel electrode PX. At the periphery of the pixel electrode PX, on the other hand, the liquid crystal molecules are aligned not in the vertical direction, but in the horizontal direction, and, thus, the alignment is disturbed. The disturbance of the alignment in this case, however, is small. This is because the liquid crystal molecules are, on average, aligned in the twelve o'clock direction in the OFF state, and, thus, the liquid crystal molecules tend not be aligned, due to the elasticity of the liquid crystal layer LC, with the direction of the electric field. Therefore, the light leakage of the backlight by the disturbance in the alignment in this case can be prevented by light shielding by the video signal line DL.

Figure 32A:
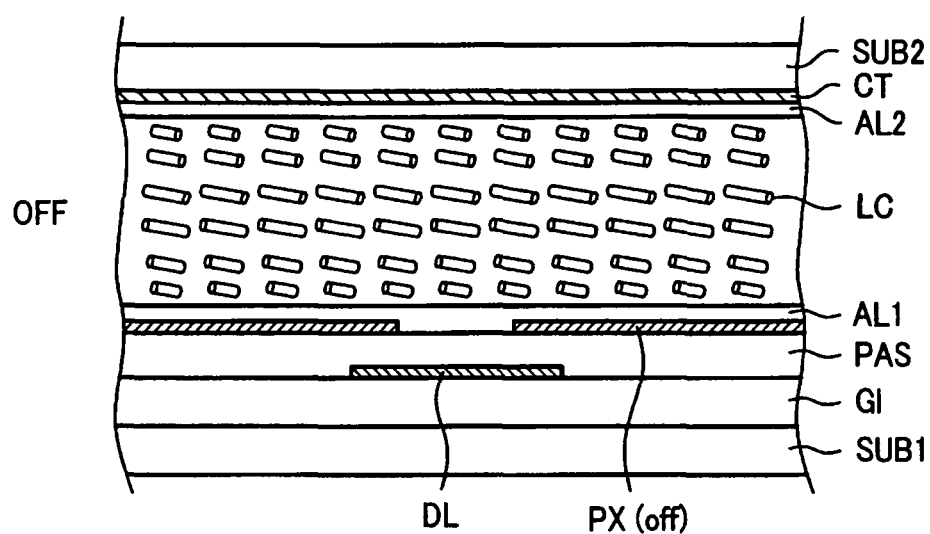
FIGS. 32A and 32B are schematic diagrams of frame inversion driving with a three o'clock viewing angle.
Figure 32B:
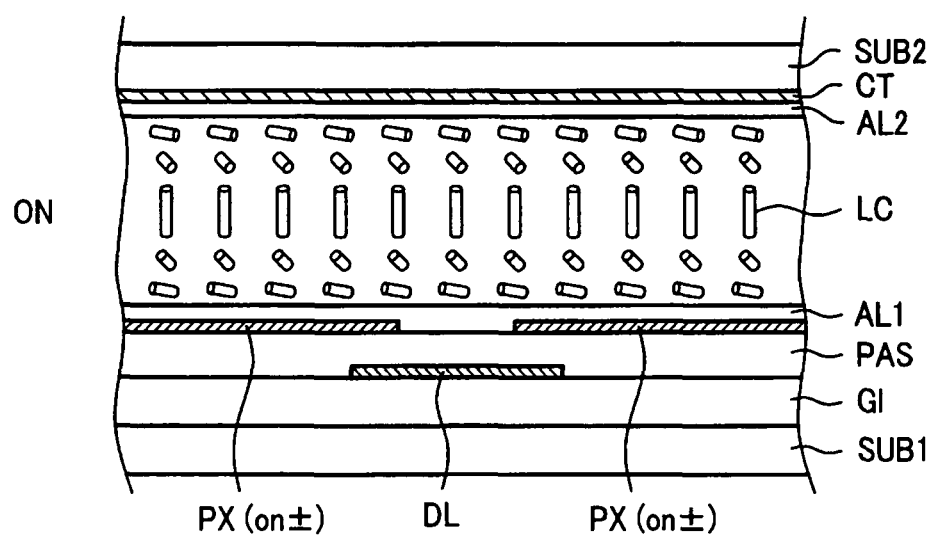

FIGS. 32A and 32B are schematic operational diagrams of frame inversion driving with the three o'clock viewing angle. FIG. 32A shows an OFF state and the liquid crystal molecules are aligned approximately in the horizontal direction. FIG. 32B shows an ON state. Because the driving method is frame inversion driving, no electric field is generated between pixels adjacent to each other over the video signal line DL. Therefore, alignment disturbance at the periphery of the pixel does not occur.

Figure 33A:
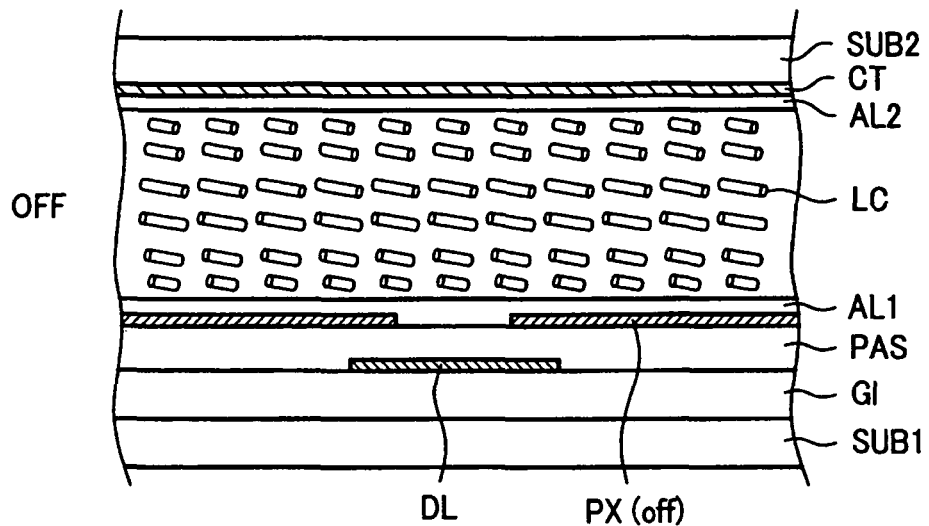
FIGS. 33A and 33B are schematic diagrams of dot inversion driving with a three o'clock viewing angle.
Figure 33B:
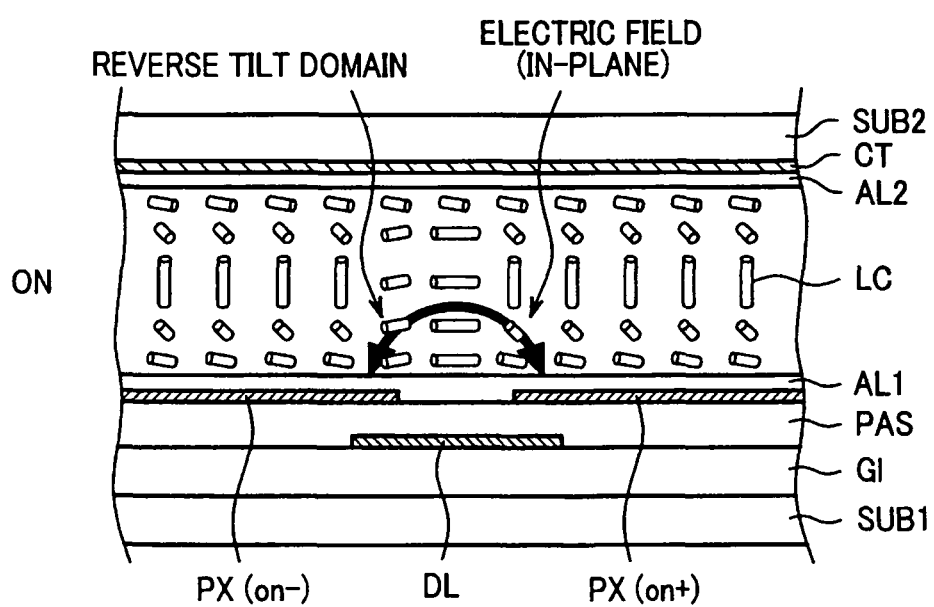

FIGS. 33A and 33B are schematic operational diagrams of dot inversion driving with the three o'clock viewing angle. FIG. 33A shows an OFF state, and the liquid crystal molecules are aligned approximately in the horizontal direction. FIG. 33B shows an ON state. Because the driving method is the dot inversion driving, voltages of polarities which differ from each other are applied to pixels on both sides of the video signal line DL. In FIG. 33B, a negative potential with respect to the potential on the opposing electrode CT is applied to the pixel at the left and a positive potential with respect to the potential on the opposing electrode CT is applied to the pixel at the right.

In this state, near the center along the thickness direction of the liquid crystal layer LC, the liquid crystal molecules are aligned in the vertical direction over the pixel electrode PX. At the periphery of the pixel electrode PX, on the other hand, the liquid crystal molecules are aligned not in the vertical direction, but in the horizontal direction, and, thus, the alignment is disturbed. The disturbance in the alignment in this case is large compared to the case of FIG. 31. That is, the liquid crystal molecules are aligned, on average, in the three o'clock direction in the initial state. This alignment is in the same direction as the horizontal electric field generated between the pixels at the ON state, and, unlike the case of the twelve o'clock viewing angle, there is no resistance by the elasticity of the liquid crystal layer LC. Therefore, as shown in FIG. 33B, the disturbance of the alignment between pixels affects a large area of the liquid crystal layer LC. In particular, at the periphery of the pixel at the left, a reverse tilt domain in which the alignment of the liquid crystal is reversed occurs. Because the alignment disturbance of the liquid crystal layer LC occurs in a wide area, the light leakage cannot be prevented with a normal light shielding with the video signal line DL.

Figure 34:
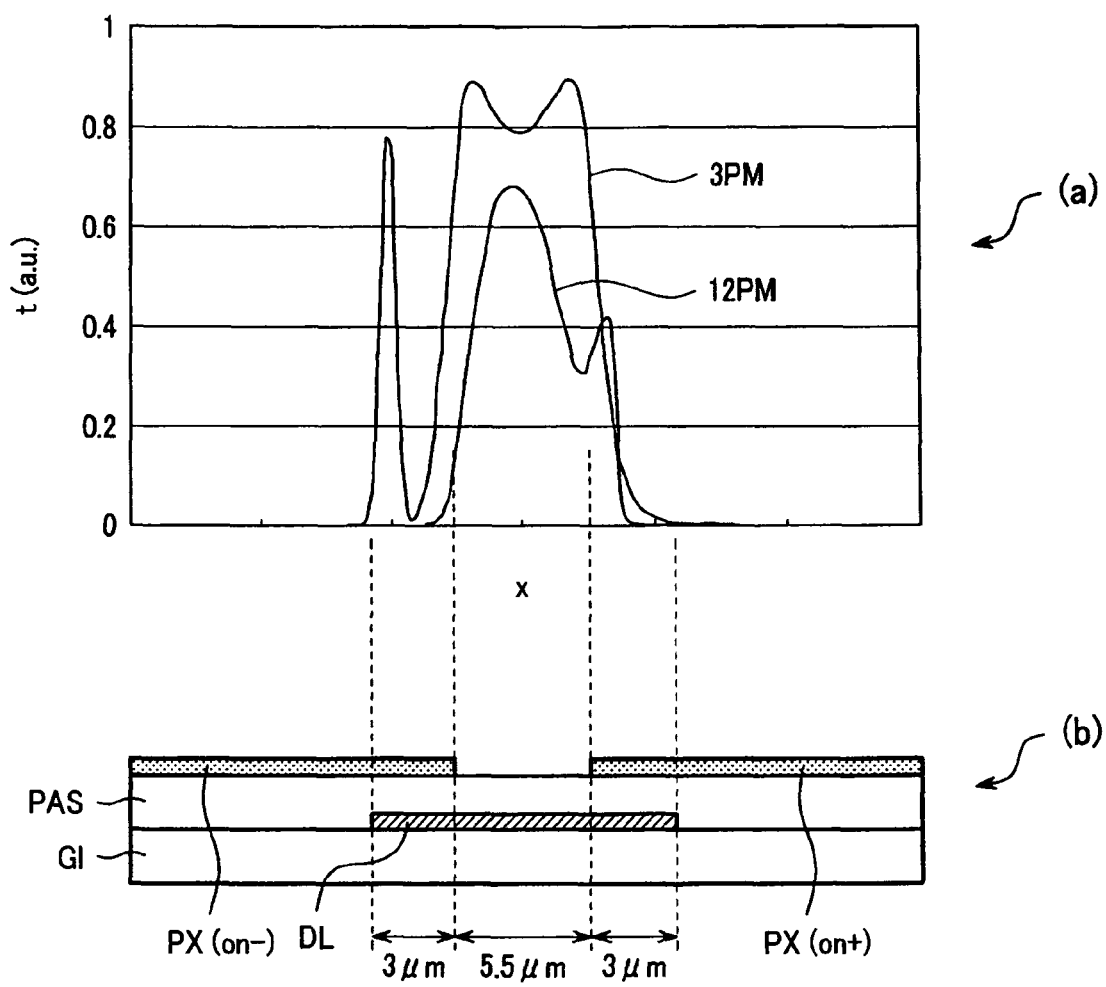
FIG. 34 shows a comparison between a three o'clock viewing angle and a twelve o'clock viewing angle in a dot inversion driving method.

FIG. 34 is a graph summarizing the above description. In (a) of FIG. 34, the horizontal axis x represents a position and the vertical axis t represents transmittance of the liquid crystal layer LC. In (b) of FIG. 34, positions of the pixel electrode PX and the video signal line DL corresponding to (a) are shown. In (b), an end of the pixel electrode PX and an end of the video signal line DL overlap each other by 3 μm. The spacing between a pixel electrode PX and another pixel electrode PX is 5.5 μm. Because FIG. 34 shows the ON state, a negative potential with respect to the potential on the opposing electrode CT is applied to the pixel electrode PX at the left and a positive potential with respect to the potential on the opposing electrode CT is applied to the pixel electrode PX at the right. Therefore, a horizontal electric field is generated between the pixel electrode PX at the right and the pixel electrode PX at the left, and the alignment of the liquid crystal molecules is disturbed. Because of this, the liquid crystal layer LC does not completely block the light and would have a certain transmittance.

In (a), 12 PM indicates the case of the twelve o'clock viewing angle and 3 PM indicates the case of the three o'clock viewing angle. Because the alignment disturbance is larger for the case of the three o'clock viewing angle than in the case of the twelve o'clock viewing angle, the transmittance at the overlapping portion of the pixel electrode and the video signal line DL is larger in the case of the three o'clock viewing angle. In the case of the twelve o'clock viewing angle, because the transmitting portion due to the disturbance in the alignment is blocked by the video signal line DL, no light leakage occurs. In the case of the three o'clock viewing angle, on the other hand, two crests occur, one having a wide width and the other being a sharp crest. Because the crest with a wide width is blocked by the video signal line DL, there is no light leakage. For the crest formed on the left and having a narrow width, on the other hand, the light cannot be completely blocked by the video signal line DL, and light leakage of the backlight is caused, resulting in a reduction in the contrast. The crest with narrow width is caused by the disclination line due to the reverse tilt. The present invention attempts to prevent the light leakage in the case of the three o'clock viewing angle. As already described above, the case of the nine o'clock viewing angle is similar to the case of the three o'clock viewing angle except that the crest with the narrow width is formed at the right of the video signal line DL in the case of the nine o'clock viewing angle. Therefore, the below-described preferred embodiments are also applicable to the nine o'clock viewing angle.

First Preferred Embodiment

Figure 1A:
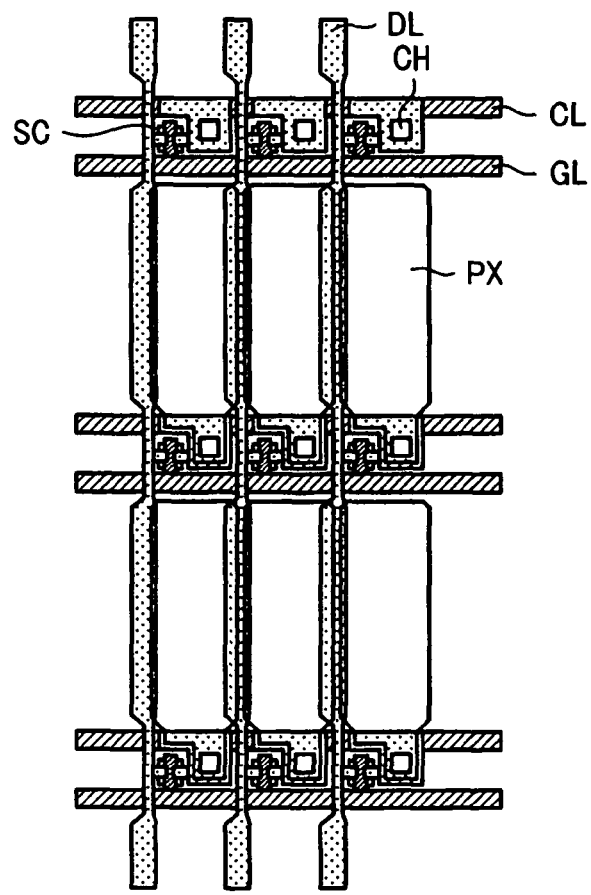
FIGS. 1A and 1B are schematic diagrams showing a first preferred embodiment according to the present invention.
Figure 1B:
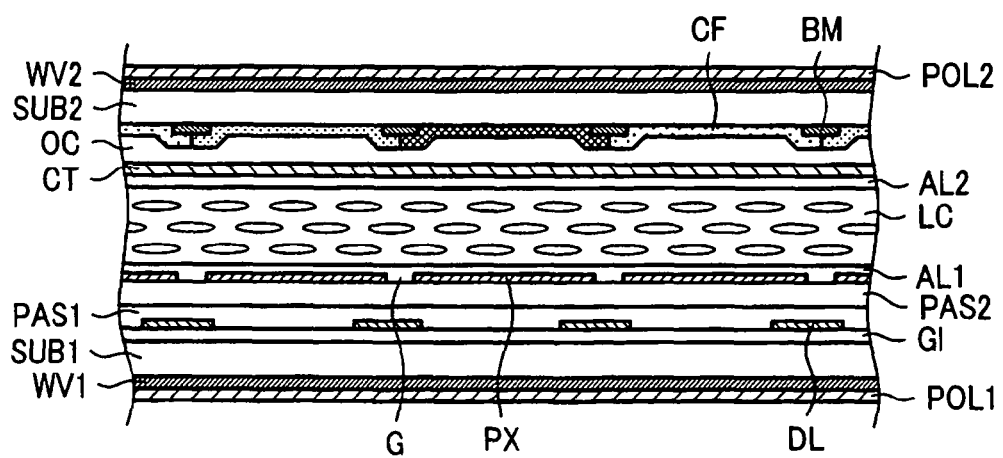

FIGS. 1A and 1B are schematic diagrams showing a principle of a first preferred embodiment of the present invention. FIG. 1 shows a liquid crystal display device with the three o'clock viewing angle. FIG. 1A is a plan view of the first substrate SUB1 and FIG. 1B is a cross sectional diagram of a state in which the firs substrate SUB1 and the second substrate SUB2 are combined. In the case of the three o'clock viewing angle, the disclination line due to the reverse tilt occurs at the left of the video signal line DL. Therefore, by increasing an amount of overlap between the pixel electrode PX and the video signal line DL at the left of the video signal line DL, it is possible to block only the portion corresponding to the disclination line and improve the contrast without causing a significant reduction in the aperture ratio. More specifically, the width of the video signal line DL is increased at the left of the video signal line DL.

In FIG. 1A, storage capacitor lines CL and scan lines GL extend along the horizontal direction and are arranged in the vertical direction. Between the storage capacitor line CL and the scan line GL, a thin film transistor (TFT) including a semiconductor layer SC and a contract hole CH for connecting the TFT and the pixel electrode PX, or the like are formed. Video signal lines DL extend along the vertical direction and are arranged in the horizontal direction. The pixel electrode PX is formed between a video signal line DL and another video signal line DL. An end of the pixel electrode PX overlaps, in the plan view, with the video signal line DL, in order to maximize the aperture ratio. An amount of overlap between the end of the pixel electrode PX and the video signal line DL is larger at the left of the video signal line DL than at the right of the video signal line DL, in order to light-shield the disclination line by the reverse tilt.

In FIG. 1B, a lower viewing angle expansion film WV1 and a lower polarizer plate POL1 are adhered to a lower side of the first substrate SUB1. At an inner side of the first substrate SUB1, a gate insulating film GI, the video signal line DL, the first passivation film PAS1, and the second passivation film PAS2 are formed, and the pixel electrode PX is formed over these structures. The lower alignment film AL1 is formed covering the pixel electrode PX. Over the second substrate SUB2, on the other hand, an upper viewing angle expansion film WV2 and an upper polarizer plate POL2 are adhered. At an inner side of the second substrate SUB2, a black matrix BM and a color filter CF are formed. An overcoat film OC is formed covering the color filter CF, and the opposing electrode CT and the upper alignment film AL2 are formed over the overcoat film OC. The liquid crystal layer LC is provided between the first substrate SUB1 and the second substrate SUB2.

In FIG. 1B, a center of a gap G between the pixel electrodes PX and a center of the black matrix BM match each other, but the center of the video signal line DL is shifted to the left from the center of the gap G between the pixel electrodes PX. By employing this configuration, it is possible to light-shield the disclination line due to the reverse tilt occurring at the left of the video signal line DL.

Figure 2A:
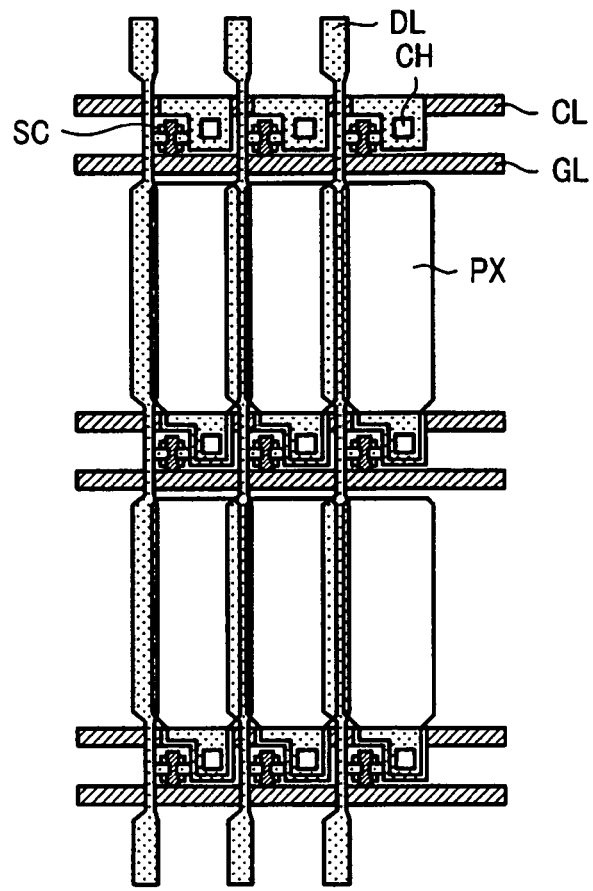
FIGS. 2A and 2B are schematic diagrams showing another configuration of a first preferred embodiment according to the present invention.
Figure 2B:
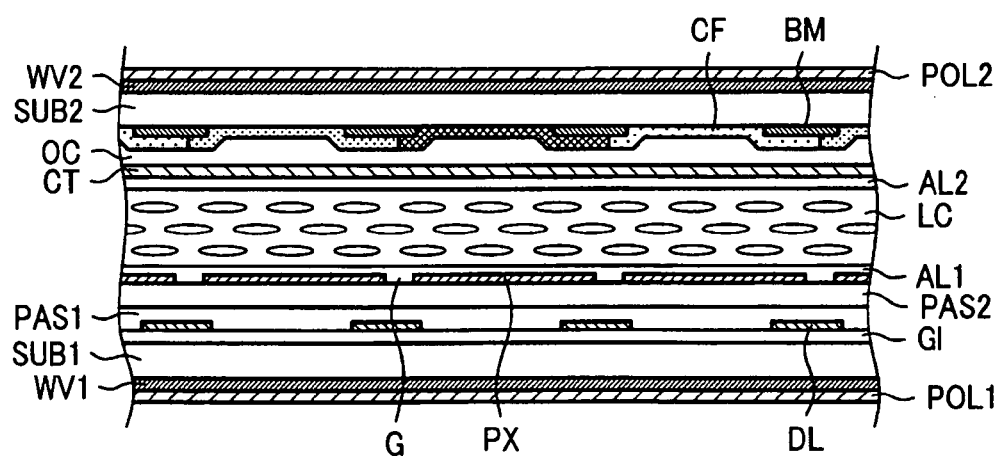

FIGS. 2A and 2B show an alternative configuration of the present embodiment. In the structure of FIG. 1, the disclination line due to the reverse tilt is light-shielded by only the video signal line DL. In the present configuration, the disclination line due to the reverse tilt is doubly light-shielded by both the video signal line DL and the black matrix BM. FIG. 2A is a plan view of the first substrate SUB1 and is similar to FIG. 1A.

FIG. 2B is a cross sectional diagram of a liquid crystal display device of the present configuration. FIG. 2B is similar to FIG. 1B except for the position of the black matrix BM. In FIG. 2B, the center of the black matrix BM is shifted to the left from the center of the gap G between the pixel electrodes PX. With this structure, the disclination line due to the reverse tilt can be light-shielded. In other words, with the present configuration, because the disclination line due to the reverse tilt can be light-shielded both by the video signal line DL and the black matrix BM, the contract can further be improved.

The disclination line can be light-shielded with the structure of FIGS. 2A and 2B. However, in general, because of the positioning mismatch between the first substrate SUB1 and the second substrate SUB2, the position between the black matrix BM and the pixel electrode PX or between the black matrix BM and the video signal line DL may be deviated. In such a case, with the structure of FIGS. 2A and 2B, the aperture ratio of the pixel electrode PX is reduced. Because the brightness is reduced when the aperture ratio is reduced, it is desired to minimize the reduction in the aperture ratio. In addition, the reduction in the aperture ratio may occur not only due to the positioning mismatch between the first substrate SUB1 and the second substrate SUB2, but also when there is a variation in the sizes themselves of the black matrix BM and the pixel electrode PX.

Figure 3:
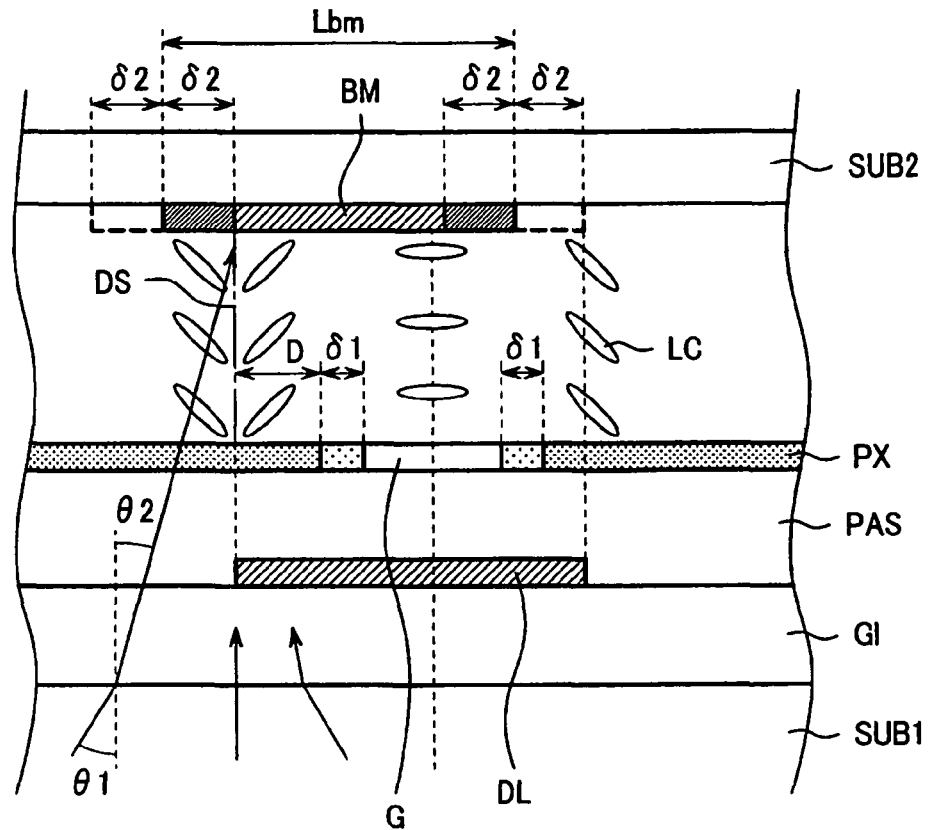
FIG. 3 is a schematic diagram showing yet another configuration of a first preferred embodiment according to the present invention.

FIG. 3 shows a countermeasure structure for these problems. FIG. 3 is a schematic cross sectional diagram showing primary portions of a third preferred configuration of the present embodiment. In FIG. 3, structures other than the portions necessary for the description are omitted. In FIG. 3, the gate insulating film GI is formed over the first substrate SUB1 and the video signal line DL is formed over the gate insulating film GI. The passivation film PAS is formed over the video signal line DL, and the pixel electrode. PX is formed over the passivation film PAS. Over the second substrate SUB2, on the other hand, the black matrix BM is formed in portions corresponding to the video signal line DL of the first substrate SUB1.

In FIG. 3, δ1 represents a change when a positioning mismatch of the pixel electrode PX or a variation in the size occurs. Although FIG. 3 only shows a case in which the gap G between pixel electrodes PX is increased by δ1, in reality, there may be an opposite case. In addition, δ2 represents a positioning mismatch of the black matrix BM or a variation in the size. Moreover, D represents a distance from the end of the pixel electrode PX to the disclination line DS when the gap G between the pixel electrodes PX becomes the largest (when one side of the pixel electrode PX is reduced by δ1).

In FIG. 3, the pixel electrode PX at the left is defined as a first pixel electrode PX and the pixel electrode PX at the right is defined as a second pixel electrode PX. On the side of the first pixel electrode PX, the black matrix BM extends to an outer position than the video signal line DL, and, on the side of the second pixel electrode PX, the video signal line DL extends to an outer position than the black matrix BM.

In FIG. 3, the width of the black matrix BM is Lbm. The black matrix BM extends further to the left by δ2 compared to the video signal line DL. In this case, the disclination line is sufficiently covered by the black matrix BM. On the other hand, at the right side of the black matrix BM, the video signal line DL extends to an outer position than the black matrix BM. The transmission of light of the liquid crystal layer LC by the alignment disturbance at the right side is blocked by the video signal line DL.

In this case, even if the black matrix BM is moved to the left with respect to the video signal line DL, the disclination line would not be viewed. In addition, because the video signal line DL blocks the light on the side of the second pixel electrode PX, light leakage does not occur. On the other hand, even when the black matrix BM is deviated by δ2 to the right with respect to the video signal line DL, the disclination line can be barely covered on the side of the first pixel electrode PX. In other words, as shown by an arrow in FIG. 3, the light from the backlight is blocked by an end of the black matrix BM. On the side of the second pixel electrode PX, on the other hand, the left end of the black matrix BM matches the left end of the video signal line DL. Therefore, the reduction in the transmittance of light due to the deviation of the black matrix BM can be avoided on the side of the second pixel electrode PX.

In this manner, by extending the black matrix BM to an outer position than the video signal line DL on the side of the first pixel electrode PX and extending the video signal line DL to an outer position than the black matrix BM on the side of the second pixel electrode PX as in the present configuration, it is possible to prevent light leakage by the alignment disturbance, in particular, the reverse tilt domain, and to minimize the reduction in the aperture ratio.

Second Preferred Embodiment

Figure 4:
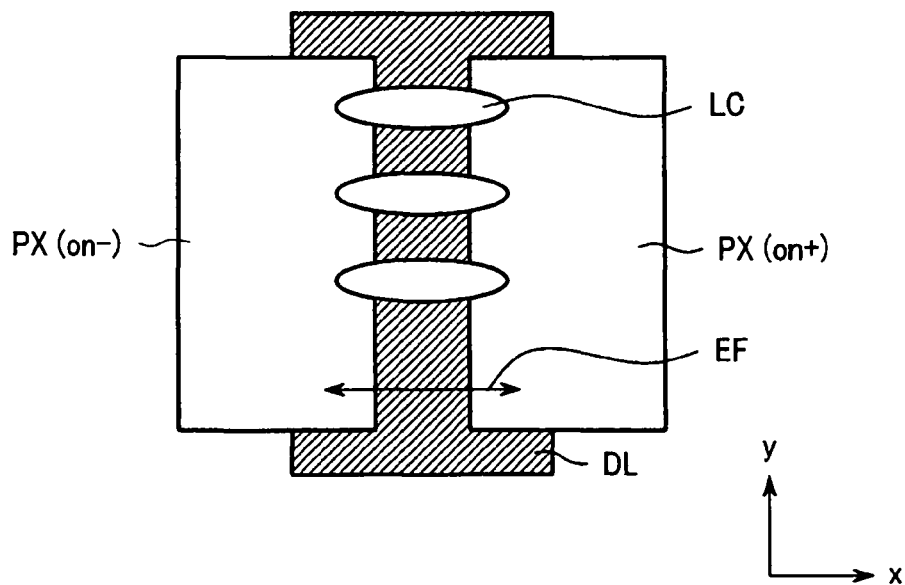
FIG. 4 is an explanatory diagram of a second preferred embodiment according to the present invention.
Figure 5A:
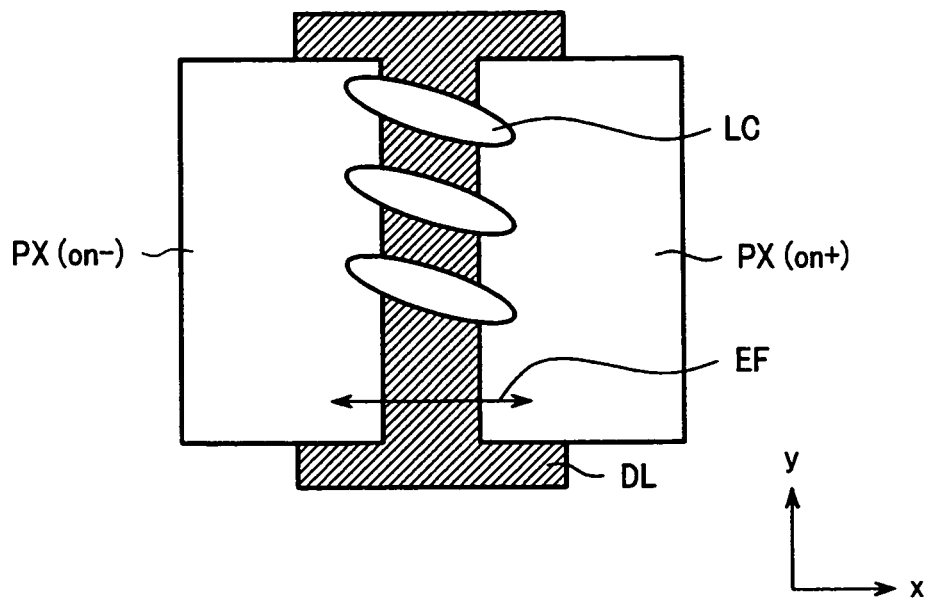
FIGS. 5A and 5B are other explanatory diagrams of a second preferred embodiment according to the present invention.
Figure 5B:
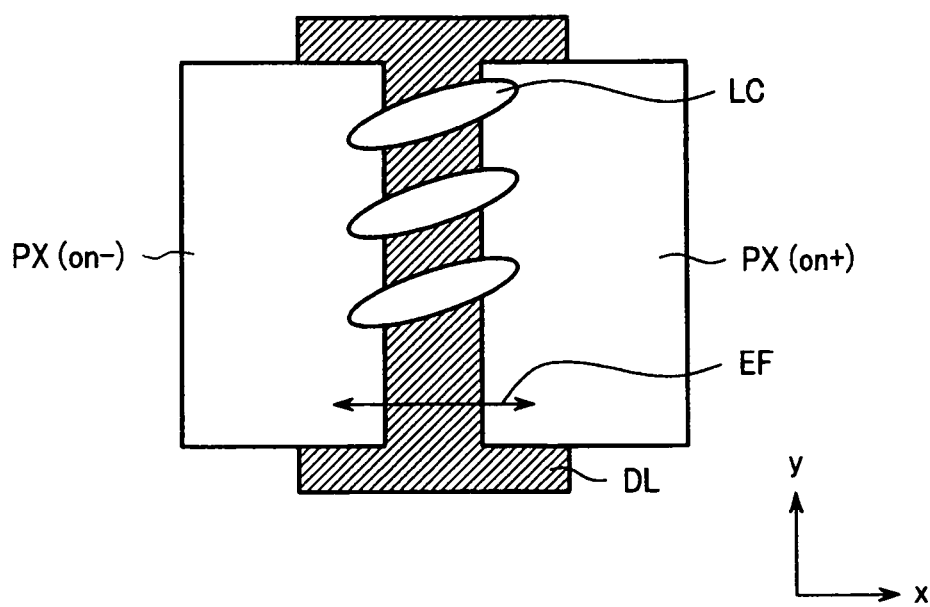

In a second preferred embodiment of the present invention, the alignment disturbance is reduced by controlling the direction of the initial alignment vector of the first substrate SUB1 or of the second substrate SUB2 and the direction of the electric field between the pixels. FIGS. 4, 5A, and 5B are diagrams for explaining this structure. FIG. 4 shows a state in which the video signal line DL and an end of the pixel electrode PX overlap each other in the plan view. In FIG. 4, because the structure is in the ON state with dot inversion driving, a negative potential with respect to a potential on the opposing electrode CT (not shown) is applied to the pixel electrode PX at the left and a positive potential with respect to the potential on the opposing electrode CT is applied to the pixel electrode PX at the right. Therefore, an electric field EF is generated between the opposing pixel electrodes PX. In addition, because the initial alignment direction of the liquid molecules is in a direction parallel to the electric field, the configuration is most easily affected by the alignment disturbance. Here, the initial alignment direction of the liquid crystal molecules refers to an initial alignment direction at a center portion along the thickness direction of the liquid crystal layer LC. This definition also applies in the following description.

FIG. 5 shows a state in which the initial alignment direction of the liquid crystal molecules is set different from the direction of the electric field formed by the first pixel electrode PX and the second pixel electrode PX. FIG. 5A shows a case in which the initial alignment direction of the liquid crystal molecules is tilted by a certain angle in the clockwise direction from the direction of the electric field formed by the first pixel electrode PX and the second pixel electrode PX. In this case, because the liquid crystal molecules must be rotated against the elasticity of the liquid crystal layer LC in order to direct the liquid crystal molecules in the direction of the electric field, the degree of the alignment disturbance is smaller compared to the case of FIG. 4.

FIG. 5B shows a case in which the initial alignment direction of the liquid crystal molecules is tilted by a certain angle in the counterclockwise direction from the direction of the electric field formed by the first pixel electrode PX and the second pixel electrode PX. In this case also, because the liquid crystal molecules must be rotated against the elasticity of the liquid crystal layer LC in order to direct the liquid crystal molecules in the direction of the electric field, the degree of alignment disturbance is smaller compared to the case of FIG. 4.

Figure 6:
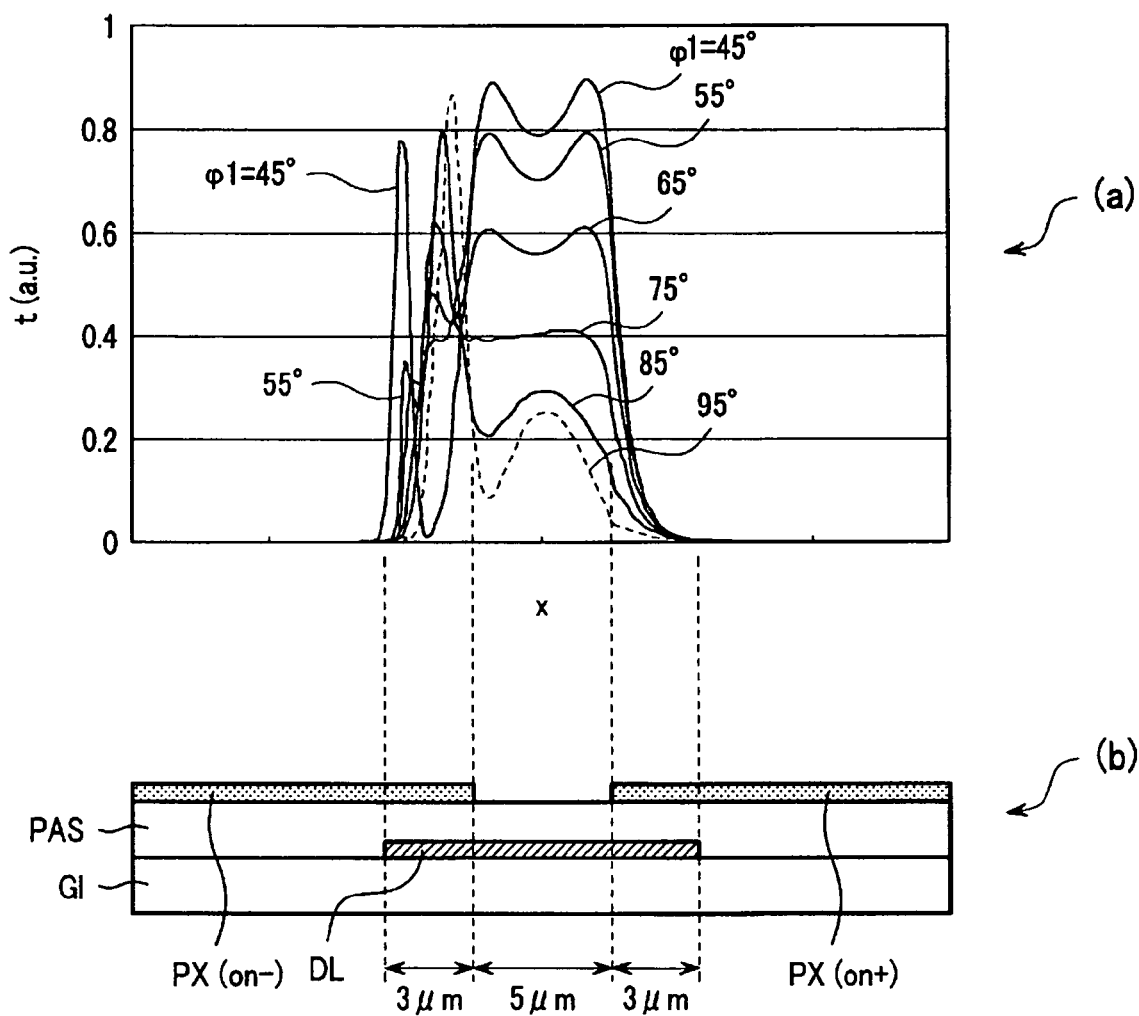
FIG. 6 is a graph showing an advantage of a second preferred embodiment according to the present invention.

FIG. 6 shows a change of an amount of the alignment disturbance when the initial alignment direction of the liquid crystal molecules is changed. In FIG. 6, the horizontal axis x represents the position and the vertical axis t represents the transmittance of the liquid crystal layer LC. In FIG. 6, (b) shows positions of the pixel electrode PX and the video signal line DL corresponding to (a). Because FIG. 6 shows the ON state, a negative potential with respect to a potential on the opposing electrode CT (not shown) is applied to the pixel electrode PX at the left and a positive potential with respect to the potential on the opposing electrode CT is applied to the pixel electrode PX at the right. Therefore, a horizontal electric field is generated between the pixel electrode PX at the right and the pixel electrode PX at the left, and the alignment of the liquid crystal molecules is disturbed. Because of this, the liquid crystal layer LC does not completely block the light, and would have a certain transmittance.

In FIG. 6, (a) shows a change of the transmittance of the liquid crystal by the alignment disturbance when the direction of the alignment vector VSUB1 of the first substrate SUB1 is changed. Because the alignment vector VSUB1 of the first substrate SUB1 and the alignment vector VSUB2 of the second substrate SUB2 are in directions which are 90 degrees from each other, by changing the direction of the alignment vector VSUB1 of the first substrate SUB1, it is possible to change the alignment of the liquid crystal molecules at the center portion along the thickness direction of the liquid crystal layer LC.

In (a), when the direction $\phi 1$ of the alignment vector VSUB1 of the first substrate SUB1 is at 45 degrees, the direction of the initial alignment of the liquid crystal molecules at the center along the thickness direction of the liquid crystal layer LC matches the direction of the parallel electric field between pixels. Therefore, the alignment disturbance is the largest when the direction of the alignment vector VSUB1 of the first substrate SUB1 is at 45 degrees. In addition, the disclination line due to the reverse tilt is positioned at the outermost position. As the alignment vector VSUB1 of the first substrate SUB1 increases from 45 degrees, the alignment disturbance is reduced and the disclination line due to the reverse tilt moves to the inside.

Figure 7:
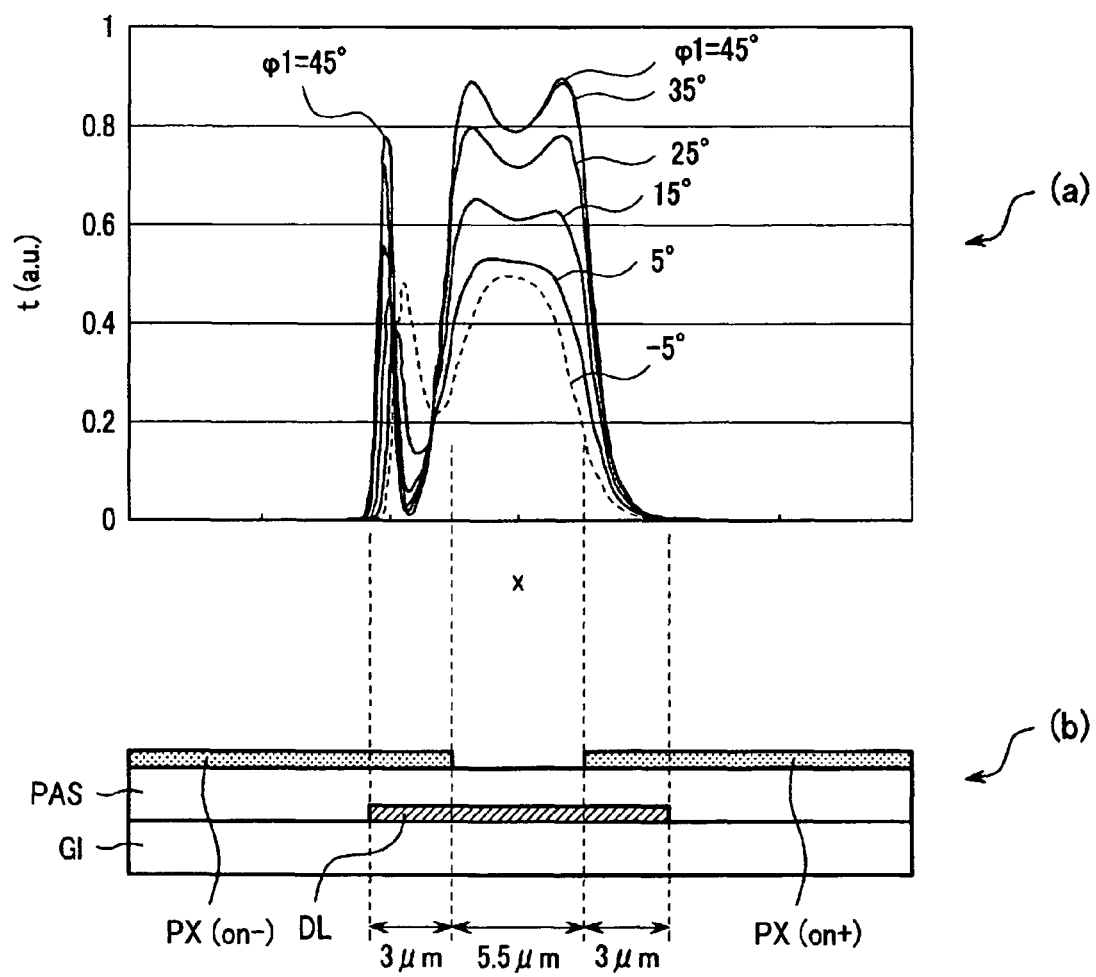
FIG. 7 is another graph showing an advantage of a second preferred embodiment according to the present invention.

FIG. 7 shows a change of the amount of alignment disturbance when the initial alignment direction of the liquid crystal molecules is changed in a direction opposite to the direction in FIG. 6. In FIG. 7, the structure of (b) is similar to the structure of (b) in FIG. 6. In FIG. 7, (a) shows a change of the transmittance of the liquid crystal due to the alignment disturbance when the direction of the alignment vector VSUB1 of the first substrate SUB1 in FIG. 25 is changed. Because the alignment vector VSUB1 of the first substrate SUB1 and the alignment vector VSUB2 of the second substrate SUB2 are in directions which are 90 degrees from each other, by changing the direction of the alignment vector VSUB1 of the first substrate SUB1, it is possible to change the alignment of the liquid crystal molecules at the center portion of the liquid crystal layer LC.

In (a), when the direction $\phi 1$ of the alignment vector VSUB1 of the first substrate SUB1 is at 45 degrees, the direction of the initial alignment of the liquid crystal molecules at the center along the thickness direction of the liquid crystal layer LC matches the direction of the parallel electric field between pixels. Therefore, the alignment disturbance is the largest when the direction of the alignment vector VSUB1 of the first substrate SUB1 is at 45 degrees. In addition, the disclination line due to the reverse tilt is positioned at the outermost position. As the alignment vector VSUB1 of the first substrate SUB1 is reduced from degrees, the alignment disturbance is reduced, and the disclination line due to the reverse tilt is also moved toward the inside.

Figure 8A:
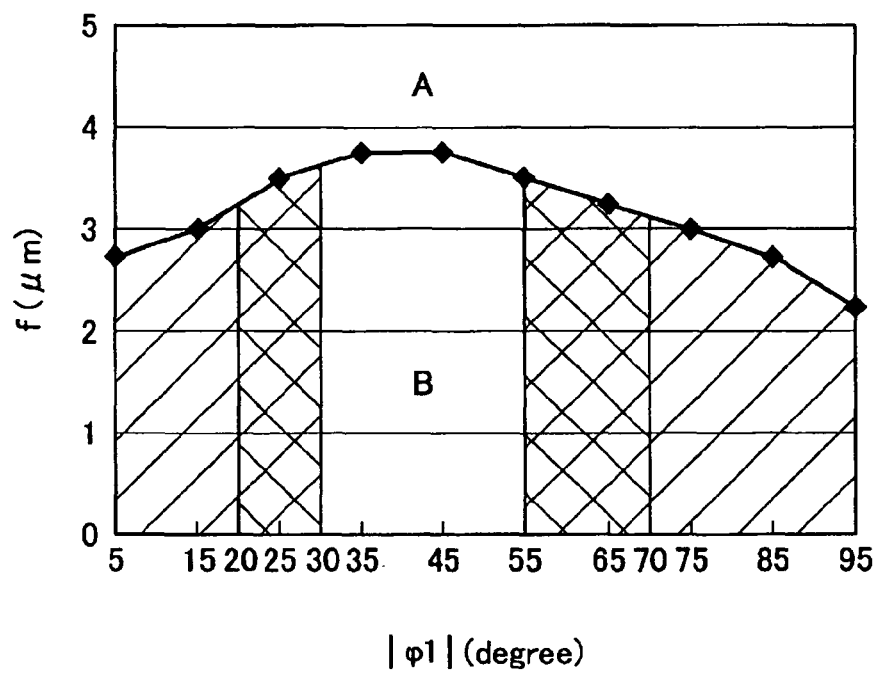
FIGS. 8A and 8B are graphs summarizing advantages of a second preferred embodiment according to the present invention.
Figure 8B:
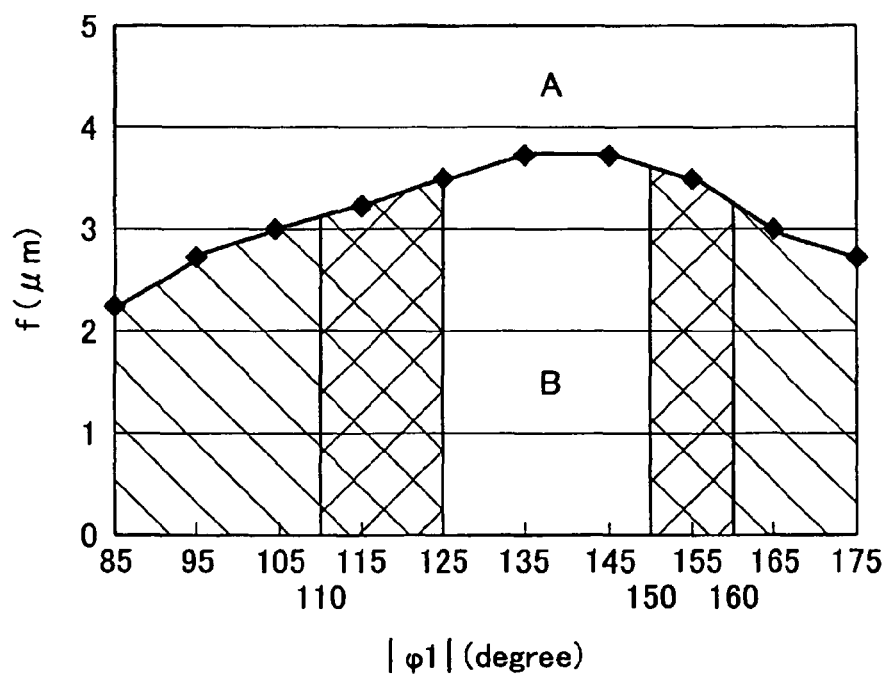

In other words, in both cases of FIGS. 6 and 7, the amount of alignment disturbance is reduced as the direction of the alignment vector VSUB1 of the first substrate SUB1 changes away from 45 degrees. This indicates that the amount of overlap of the pixel electrode PX and the video signal line DL for preventing light leakage can be changed by changing the direction of the alignment vector VSUB1 of the first substrate SUB1. FIGS. 8A and 8B show this situation.

In FIGS. 8A and 8B, the horizontal axis represents an absolute value of an angle φ1 of the direction of the alignment vector VSUB1 of the first substrate SUB1 with respect to the x-axis and the vertical axis represents an amount f of the overlap of the pixel electrode PX and the video signal line DL for preventing light leakage. Here, the x-axis is in a direction perpendicular to the video signal line DL, that is, the direction of the parallel electric field between adjacent pixels. In FIGS. 8A and 8B, a region A represents a region in which the light leakage does not occur, and a region B represents a region in which the light leakage occurs. In FIG. 8A, when the absolute value of the angle φ1 of the direction of the alignment vector VSUB1 of the first substrate SUB1 with respect to the x-axis is 45 degrees, the necessary amount of overlap of the pixel electrode PX and the video signal line DL is the largest. When the direction of the alignment vector VSUB1 of the first substrate SUB1 is to be reduced with respect to the x-axis, by setting the absolute value of the angle φ1 with respect to the direction of the x-axis, that is, the horizontal direction of the first substrate SUB1 to less than or equal to 30 degrees and greater than or equal to 0 degree, it is possible to obtain the advantage of inhibiting the alignment disturbance. When, on the other hand, the absolute value of φ1 in FIG. 8A is to be substantially reduced by bending the video signal line DL and the pixel electrode PX while maintaining the three o'clock viewing angle as will be described below, if the direction of the alignment vector VSUB1 of the first substrate SUB1 is too close to the direction of the x-axis (when the absolute value of φ1 in FIG. 8A is too small), the bending angle of the video signal line DL and the pixel electrode PX becomes too large, resulting in an inferior appearance of the image. Therefore, a more preferable angle is set with the absolute value of φ1 in FIG. 8A being less than or equal to 30 degrees and greater than or equal to 20 degrees.

When the direction of the alignment vector VSUB1 of the first substrate SUB1 is to be increased with respect to the x-axis, by setting the absolute value of the angle φ1 with respect to the direction of the x-axis, that is, the horizontal direction of the first substrate SUB1 to greater than or equal to 55 degrees and less than or equal to 90 degrees, it is possible to obtain the advantage of inhibiting the alignment disturbance. When, on the other hand, the absolute value of φ1 in FIG. 8A is to be substantially increased by bending the video signal line DL and the pixel electrode PX while maintaining the three o'clock viewing angle as will be described below, if the direction of the alignment vector VSUB1 of the first substrate SUB1 is too close to a direction perpendicular to the x-axis (if the absolute value of φ1 in FIG. 8A is too large), the bending angle of the video signal line DL and the pixel electrode PX becomes too large, resulting in an inferior appearance of the image. Therefore, a more preferable angle is set with φ1 in FIG. 8A being greater than or equal to 55 degrees and less than or equal to 70 degrees.

A configuration in which φ1 has a positive value (counterclockwise direction with respect to the x-axis) in FIG. 8A indicates a case with the rubbing direction of the three o'clock viewing angle and in which the liquid crystal is twisted in the counterclockwise direction from the second substrate SUB2 toward the first substrate SUB1. On the other hand, a configuration in which φ1 has a negative value (clockwise direction with respect to the x-axis) in FIG. 8A indicates a case with the rubbing direction of the three o'clock viewing angle and in which the liquid crystal is twisted in the clockwise direction from the second substrate SUB2 toward the first substrate SUB1.

Although a case with the rubbing direction of the three o'clock viewing angle is shown in FIG. 8A, similar characteristics are true for the other cases, that is, the case of the rubbing direction of the nine o'clock viewing angle, as shown in FIG. 8B. In FIG. 8B, when the absolute value of the angle of the alignment vector VSUB1 of the first substrate SUB1 with respect to the x-axis is 135 degrees, the necessary amount of overlap of the pixel electrode PX and the video signal line DL is the largest. When the direction of the alignment vector VSUB1 of the first substrate SUB1 is to be reduced with respect to the x-axis, by setting the absolute value of the angle with respect to the direction of the x-axis, that is, the horizontal direction of the first substrate SUB1 to less than or equal to 180 degrees and greater than or equal to 150 degrees, it is possible to obtain the advantage of inhibiting the alignment disturbance. When, on the other hand, the absolute value of φ1 in FIG. 8B is to be substantially increased by bending the video signal line DL and the pixel electrode PX while maintaining the nine o'clock viewing angle as will be described below, if the direction of the alignment vector VSUB1 of the first substrate SUB1 is too close to the direction of the x-axis (if the absolute value of φ1 in FIG. 8B is too large), the bending angle of the video signal line DL and the pixel electrode PX becomes too large, resulting in an inferior appearance of the image. Therefore, a more preferable angle is set with φ1 in FIG. 8B being less than or equal to 160 degrees and greater than or equal to 150 degrees.

When the direction of the alignment vector VSUB1 of the first substrate SUB1 is to be increased with respect to the x-axis, by setting the absolute value of the angle with respect to the direction of the x-axis, that is, the horizontal direction of the first substrate SUB1 to greater than or equal to 90 degrees and less than or equal to 125 degrees, it is possible to obtain the advantage of inhibiting the alignment disturbance. When, on the other hand, the absolute value of φ1 in FIG. 8B is substantially reduced by bending the video signal line DL and the pixel electrode PX while maintaining the nine o'clock viewing angle as will be described below, if the direction of the alignment vector VSUB1 of the first substrate SUB1 is too close to a direction perpendicular to the x-axis (if the absolute value of φ1 in FIG. 8B is too small), the bending angle of the video signal line DL and the pixel electrode PX becomes too large, resulting in an inferior appearance of the image. Therefore, a more preferable angle is set with the absolute value of φ1 of FIG. 8B being greater than or equal to 110 degrees and less than or equal to 125 degrees.

In FIG. 8B, a configuration in which φ1 has a negative value (clockwise direction with respect to the x-axis) indicates the case with the rubbing direction of the nine o'clock viewing angle and in which the liquid crystal is twisted in the counterclockwise direction from the second substrate SUB2 toward the first substrate SUB1. On the other hand, a configuration in which φ1 has a positive value (counterclockwise direction with respect to the x-axis) indicates the case with the rubbing direction of the nine o'clock viewing angle and in which the liquid crystal is twisted in the clockwise direction from the second substrate SUB2 toward the first substrate SUB1.

In the graphs of FIGS. 8A and 8B, a configuration is considered in which the direction of extension of the scan line GL is in the direction of the x-axis and the direction of extension of the video signal line DL is in the direction of the y-axis. Therefore, the absolute value of φ1 of 45 degrees corresponds to the three o'clock viewing angle and the absolute value of φ1 of 135 degrees corresponds to the nine o'clock viewing angle. Thus, although the advantage of inhibiting the alignment disturbance is increased as the absolute value of φ1 deviates from 45 degrees or 135 degrees, the viewing angle is also deviated from the three o'clock viewing angle or the nine o'clock viewing angle.

In consideration of this, as shown in FIGS. 9A, 9B, 9C, 9D, 9E, 10A, and 10B to be described below, by tilting, by an angle θ', the sides of the video signal line DL and the pixel electrode PX in the clockwise or counterclockwise direction with respect to the direction of the y-axis while maintaining the extension direction of the scan line GL at the direction of the x-axis (although the video signal line DL is locally tilted with respect to the y-axis by the angle θ', the overall video signal line DL extends in the direction of the y-axis), it is possible to rotate the direction of the electric field by an angle θ' in the clockwise or counterclockwise direction. Therefore, by tilting the sides of the video signal line DL and the pixel electrode PX with respect to the y-axis direction while maintaining the alignment vectors VSUB1 and VSUB2 at the direction of the three o'clock viewing angle or the nine o'clock viewing angle, it is possible to substantially achieve a state equivalent to a state in which the absolute value of φ1 in FIGS. 8A and 8B is deviated from 45 degrees or 135 degrees.

For example, in the case of the three o'clock viewing angle with the liquid crystal being twisted by 90 degrees in the counterclockwise direction from the second substrate SUB2 toward the first substrate SUB1 as shown in FIG. 25, φ1=+45 degrees. Here, if the video signal line DL is tilted by an angle θ' in the clockwise direction (wherein θ' is larger than 0 degree and less than or equal to 45 degrees), the x-axis in FIG. 25 (a reference for measuring the angle φ1) is also rotated by the angle θ' in the clockwise direction. Thus, this configuration corresponds to a position where the absolute value of φ1 is larger than 45 degrees in FIG. 8A (position of absolute value of (45 degrees+θ')). When, on the other hand, the video signal line DL is tilted by the angle θ' in the counterclockwise direction, the x-axis (reference for measuring the angle φ1) in FIG. 25 is also rotated by the angle θ' in the counterclockwise direction. Therefore, this configuration corresponds to a position in which the absolute value of φ1 is less than 45 degrees in FIG. 8A (position of absolute value of (45 degrees−θ')).

In the case of the three o'clock viewing angle with the liquid crystal being twisted by 90 degrees in the clockwise direction from the second substrate SUB2 toward the first substrate SUB1 as in FIG. 27, φ1=−45 degrees. Therefore, a configuration in which the video signal line DL is tilted by the angle θ' in the clockwise direction corresponds to a position in which the absolute value of φ1 is less than 45 degrees in FIG. 8A (position of absolute value of (−45 degrees+θ')). A configuration in which the video signal line DL is tilted by the angle θ' in the counterclockwise direction, on the other hand, corresponds to a position in which the absolute value of θ1 is larger than 45 degrees in FIG. 8A (position of absolute value of (−45 degrees−θ')).

In the case of the nine o'clock viewing angle with the liquid crystal being twisted by 90 degrees in the counterclockwise direction from the second substrate SUB2 toward the first substrate SUB1 as in FIG. 28, φ1=−135 degrees. Therefore, a configuration in which the video signal line DL is tilted by the angle θ' in the clockwise direction corresponds to a position in which the absolute value of φ1 is less than 135 degrees in FIG. 8B (position of absolute value of (−135 degrees+θ')). A configuration in which the video signal line DL is tilted by the angle θ' in the counterclockwise direction, on the other hand, corresponds to a position in which the absolute value of φ1 is larger than 135 degrees in FIG. 8B (position of absolute value of (−135 degrees−θ')).

In the case of the nine o'clock viewing angle with the liquid crystal being twisted by 90 degrees in the clockwise direction from the second substrate SUB2 toward the first substrate SUB1 as in FIG. 29, φ1=+135 degrees. Therefore, a configuration in which the video signal line DL is tilted by the angle θ' in the clockwise direction corresponds to a position in which the absolute value of φ1 is larger than 135 in FIG. 8B (position of absolute value of (+135 degrees+θ')). A configuration in which the video signal line DL is tilted by the angle θ' in the counterclockwise direction, on the other hand, corresponds to a position in which the absolute value of φ1 is smaller than 135 degrees in FIG. 8B (position of absolute value of (+135 degrees−θ')).

In FIG. 8A (three o'clock viewing angle), compared to the case of the absolute value of φ1 of 45 degrees (corresponding to the angle of θ' of 0 degree), a range of the absolute value of φ1 being greater than or equal to 55 degrees (corresponding to the angle θ' of greater than or equal to 10 degrees) and a range of the absolute value of φ1 of less than or equal to 30 degrees (corresponding to the angle θ' of greater than or equal to 15 degrees) have an improved advantage of inhibiting the alignment disturbance.

Similarly, in FIG. 8B (nine o'clock viewing angle), compared to the case of the absolute value of φ1 of 135 degrees (corresponding to the angle θ' of 0 degree), a range of absolute value of φ1 of less than or equal to 125 degrees (corresponding to the angle θ' of greater than or equal to 10 degrees) and a range of the absolute value of φ1 of greater than or equal to 150 degrees (corresponding to the angle θ' of greater than or equal to 15 degrees) have an improved advantage of inhibiting the alignment disturbance.

Therefore, regardless of whether the viewing angle is the three o'clock viewing angle or the nine o'clock viewing angle, the angle θ' may be set to greater than or equal to 10 degrees in the clockwise direction or greater than or equal to 15 degrees in the counterclockwise direction when the liquid crystal is twisted in the counterclockwise direction from the second substrate SUB2 toward the first substrate SUB1. Similarly, when the liquid crystal is twisted in the clockwise direction from the second substrate SUB2 toward the first substrate SUB1, the angle θ' may be set to greater than or equal to 15 degrees in the clockwise direction or greater than or equal to 10 degrees in the counterclockwise direction.

The angle θ' is preferably less than or equal to 45 degrees. However, because the pixel is too much tilted and the appearance of the image is degraded when θ' is too large, θ' is more preferably less than or equal to 25 degrees.

FIGS. 9A, 9B, 9C, 9D, and 9E show an example structure in which the direction of the electric field between pixel electrodes PX during the ON operation and the initial alignment direction of the liquid crystal molecules are shifted in dot inversion driving while the initial alignment vector of the three o'clock viewing angle is maintained. In FIGS. 9A, 9B, 9C, 9D, and 9E, the pixel electrode PX is bent. Although the video signal line DL is also locally bent, the overall video signal line DL extends along the y-axis direction. As shown in FIG. 9E, the alignment vector VSUB1 of the first substrate SUB1 in this case is 45 degrees from the x-axis direction, the alignment vector VSUB2 of the second substrate SUB2 is 135 degrees from the x-axis, and the initial alignment direction of the liquid crystal molecules at the center along the thickness direction of the liquid crystal layer LC is parallel to the x-axis. Therefore, the parallel electric field formed by the pixel electrodes PX on both sides of the video signal line DL differs from the initial alignment direction of the liquid crystal molecules. Here, if the bending angle θ is 30 degrees (±15 degrees with respect to the y-axis), the angle of the horizontal axis in FIG. 8A is in a relationship identical to the case of 30 degrees (=45−15 degrees) or 60 degrees (=45+15 degrees), and the alignment disturbance can be inhibited. In this manner, by bending the video signal line DL and the pixel electrode PX while maintaining the three o'clock viewing angle, φ1 in FIG. 8A can be substantially increased or decreased from 45 degrees. The angle between the side of the pixel electrode PX and the y-axis is preferably less than or equal to 45 degrees. However, because the appearance of the image is degraded when the bending angle θ is too large, the angle between the side of the pixel electrode PX and the y-axis is more preferably less than or equal to 25 degrees.

As already described, regardless of whether the viewing angle is the three o'clock viewing angle or the nine o'clock viewing angle, when the liquid crystal is twisted in the counterclockwise direction from the second substrate SUB2 toward the first substrate SUB1, the angle between the side of the pixel electrode PX and the y-axis may be set to greater than or equal to 10 degrees in the clockwise direction on one side of the bent portion and greater than or equal to 15 degrees in the counterclockwise direction on the other side of the bent portion. Similarly, when the liquid crystal molecule is twisted in the clockwise direction from the second substrate SUB2 toward the first substrate SUB1, the angle of the side of the pixel electrode PX and the y-axis may be set to greater than or equal to 15 degrees in the clockwise direction on one side of the bent portion and greater than or equal to 10 degrees in the counterclockwise direction on the other side of the bent portion.

However, at the bending point, the direction of the electric field by the pixel electrodes PX and the initial alignment direction of the liquid crystal molecules are in the same direction. Therefore, at this portion, the alignment disturbance cannot be reduced. As a countermeasure for this, as shown in FIG. 9B, the amount of overlap between the pixel electrode PX and the video signal line DL is increased in the bending point compared to the other portions. Alternatively, structures as shown in FIGS. 9C and 9D may be employed. With such a structure, it is possible to realize a liquid crystal display device having a superior contrast, a large aperture ratio, and high brightness over all pixels.

Figure 10A:
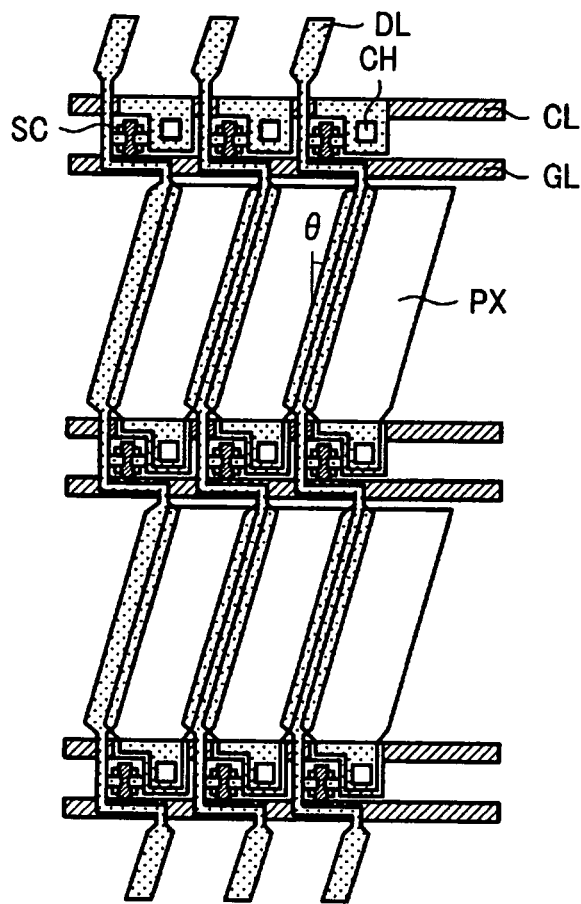
FIGS. 10A and 10B are plan views showing another configuration of a third preferred embodiment according to the present invention.
Figure 10B:
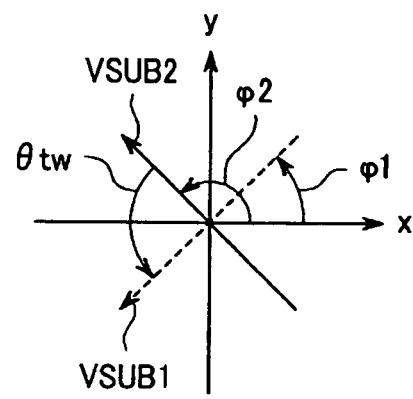

FIGS. 10A and 10B show another example structure in which the direction of the electric field between pixel electrodes PX during ON operation and the initial alignment direction of the liquid crystal molecules are shifted in the dot inversion driving while the initial alignment vector of the three o'clock viewing angle is maintained. In FIGS. 10A and 10B, the video signal line DL and the pixel electrode PX are tilted by θ with respect to the vertical direction of the first substrate SUB1, that is, the direction of the y-axis. However, the video signal line DL extends, as a whole, along the y-axis direction. The direction of the alignment vector VSUB1 of the first substrate SUB1 and the direction of the alignment vector VSUB2 of the second substrate SUB2 are similar to those in FIGS. 9A, 9B, 9C, 9D, and 9E. Therefore, the alignment direction of the liquid crystal molecules at the center along the thickness direction of the liquid crystal layer LC and the direction of the electric field between pixel electrodes PX (x-axis direction) differ from each other by the angle θ. A case of θ of 15 degrees, for example, corresponds to a case in which the horizontal axis of FIG. 8A is at 60 degrees (=45+15 degrees). Therefore, a structure with small alignment disturbance can be achieved. Although FIGS. 10A and 10B show a structure in which the direction of tilt is in the clockwise direction, a similar result can be realized even with the direction of the tilt in the counterclockwise direction. For example, a case in which the pixel electrode PX or the video signal line DL is tilted by 15 degrees in the counterclockwise direction corresponds to a case in which the horizontal axis in FIG. 8A is at 30 degrees (=45−15 degrees). In this case also, a structure with reduced alignment disturbance can be achieved.

Therefore, in summary of the range of the tilt θ, regardless of whether the viewing angle is the three o'clock viewing angle or the nine o'clock viewing angle, in the case in which the liquid crystal is twisted in the counterclockwise direction from the second substrate toward the first substrate, θ may be set to greater than or equal to 10 degrees and less than or equal to 45 degrees when the video signal line DL is tilted in the clockwise direction and greater than or equal to 15 degrees and less than or equal to 45 degrees when the video signal line DL is tilted in the counterclockwise direction. However, because the appearance of the image is degraded when the tilt θ is too large, the tilt θ is, in the case in which the liquid crystal is twisted in the counterclockwise direction from the second substrate toward the first substrate, preferably greater than or equal to 10 degrees and less than or equal to 25 degrees when the video signal line DL is tilted in the clockwise direction and greater than or equal to 15 degrees and less than or equal to 25 degrees when the video signal line DL is tilted in the counterclockwise direction. In the case in which the liquid crystal is twisted in the clockwise direction from the second substrate toward the first substrate, on the other hand, θ may be set to greater than or equal to 15 degrees and less than or equal to 45 degrees when the video signal line DL is tilted in the clockwise direction and greater than or equal to 10 degrees and less than or equal to 45 degrees when the video signal line DL is tilted in the counterclockwise direction. However, because the appearance of the image is degraded when the tilt θ is too large, the tilt θ is, in the case in which the liquid crystal is twisted in the clockwise direction from the second substrate toward the first substrate, preferably greater than or equal to 15 degrees and less than or equal to 25 degrees when the video signal line DL is tilted in the clockwise direction and greater than or equal to 10 degrees and less than or equal to 25 degrees when the video signal line DL is tilted in the counterclockwise direction.

As described above, with the present embodiment, even when dot inversion driving is applied with the three o'clock viewing angle, an image having less alignment disturbance and high contrast can be provided without a significant reduction in the aperture ratio.

Third Preferred Embodiment

Figure 11:
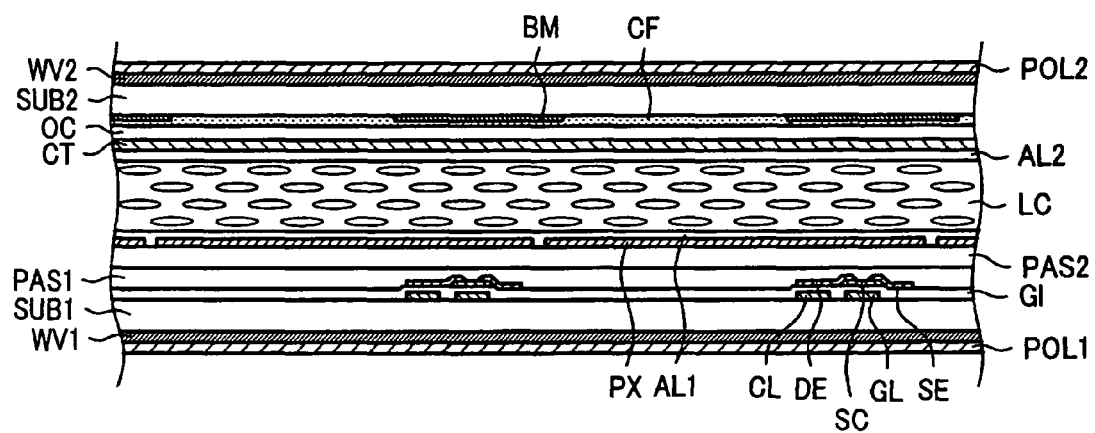
FIG. 11 is a cross sectional diagram in the vertical direction of a liquid crystal display device.

In the third preferred embodiment, the degree of alignment disturbance by the electric field between the pixel electrodes PX is reduced by controlling the thickness of the liquid crystal layer LC in the dot inversion driving with the three o'clock viewing angle. FIG. 11 is a cross sectional diagram in a direction parallel to the video signal line DL of the liquid crystal display device, that is, the y direction. In FIG. 11, the lower polarizer plate POL1 and the lower viewing angle expansion film WV1 are adhered under the first substrate SUB1. Scan lines GL and storage capacitor lines CL are formed at the inner side of the first substrate SUB1, and, over a gate insulating film GI which is formed over the scan line GL and the storage capacitor line CL, the thin film transistor (TFT) having the semiconductor layer SC, a drain electrode DE, and a source electrode SE is formed. The first passivation film PAS1 and the second passivation film PAS2 are formed covering the TFT, and the pixel electrode PX and the lower alignment film AL1 are formed over the passivation films.

Over the second substrate SUB2, the upper polarizer plate POL2 and the upper viewing angle expansion film WV2 are adhered. The black matrix BM and the color filter CF are formed at the inner side of the second substrate SUB2, and the overcoat film OC is formed over the black matrix BM and the color filter CF. The opposing electrode CT is formed over the overcoat film OC, and the upper alignment film AL2 is formed covering the opposing electrode CT. The liquid crystal layer LC is provided between the first substrate SUB1 and the second substrate SUB2.

Figure 12A:
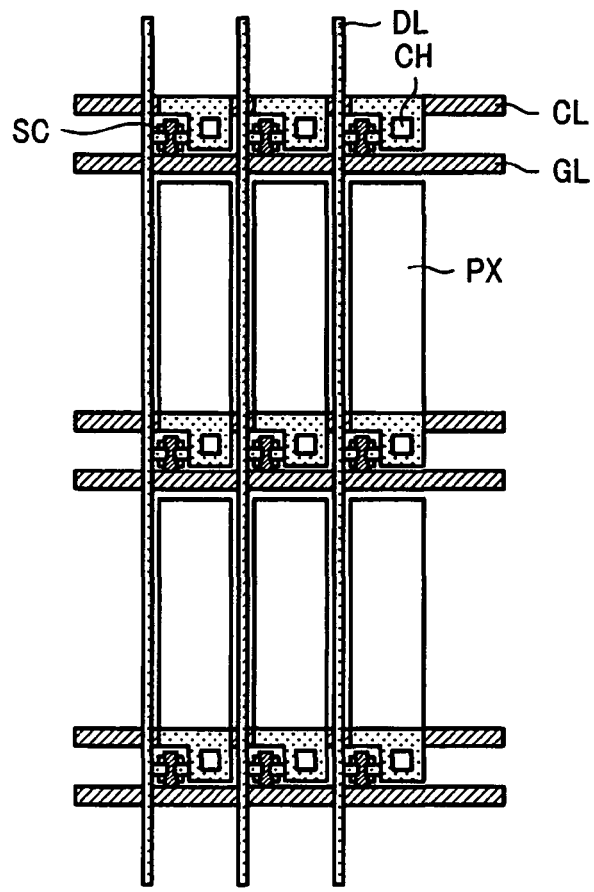
FIGS. 12A and 12B are diagrams showing a liquid crystal display device having a normal pixel structure.
Figure 12B:
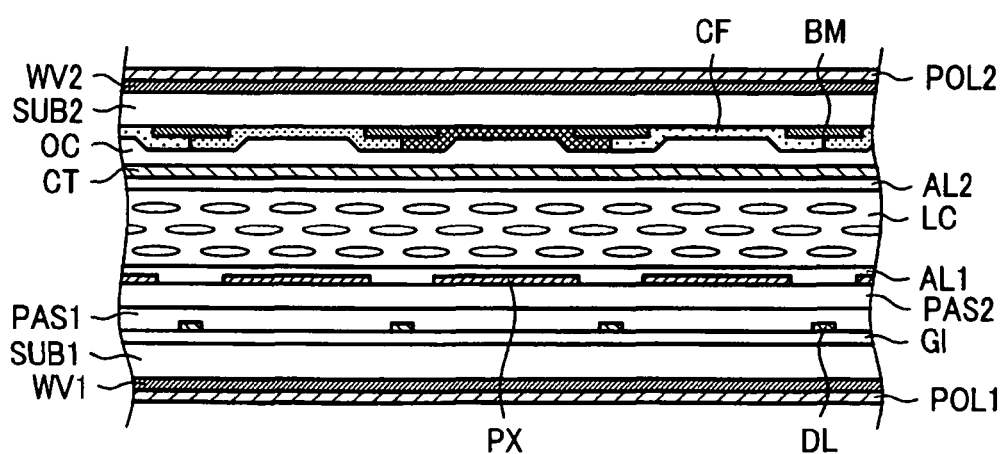

FIGS. 12A and 12B show a structure of a liquid crystal display device having a normal aperture ratio. FIG. 12A is a plan view of the first substrate SUB1 and FIG. 12B is a cross sectional diagram of the liquid crystal display device. In FIGS. 12A and 12B, the pixel electrode PX is formed between video signal lines DL, there is a gap between the pixel electrode PX and the video signal line DL. Because of this, the area of the pixel electrode PX is limited.

FIG. 12B is a cross sectional diagram along the direction of the scan line GL, that is, the direction of the x-axis of the liquid crystal display device. In FIG. 12B, the video signal line DL and the pixel electrode PX are not overlapped in the plan view, and light from the backlight leaks in this portion. The light leakage is blocked by the black matrix BM which is formed in a relatively large size.

Figure 13A:
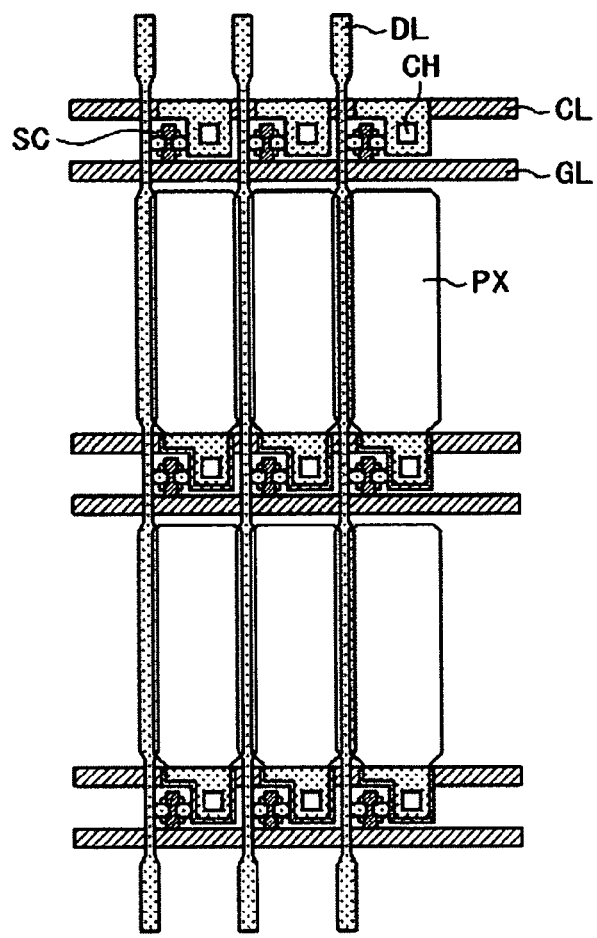
FIGS. 13A and 13B are diagrams showing a liquid crystal display device having a high-aperture-ratio pixel structure.
Figure 13B:
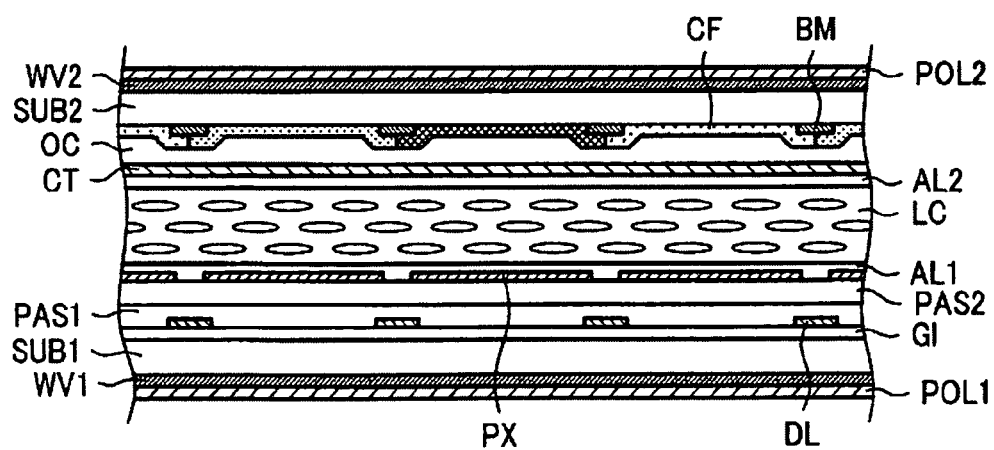

FIGS. 13A and 13B show a structure of the liquid crystal display device having a high aperture ratio. In FIG. 13A, the end of the pixel electrode PX and the video signal line DL overlap each other. Because there is no gap between the pixel electrode PX and the video signal line DL, the aperture ratio can be increased. FIG. 13B is a cross sectional diagram in the direction of the scan line GL, that is, the direction of the x-axis of the liquid crystal display device. In FIG. 13B, the end of the pixel electrode PX and the video signal line DL overlap each other in the plan view. In FIGS. 13A and 13B, the video signal line DL has an important role in light shielding. Because the video signal line DL has the light-shielding effect, the width of the black matrix BM is reduced so that the aperture ratio is increased.

Figure 14A:
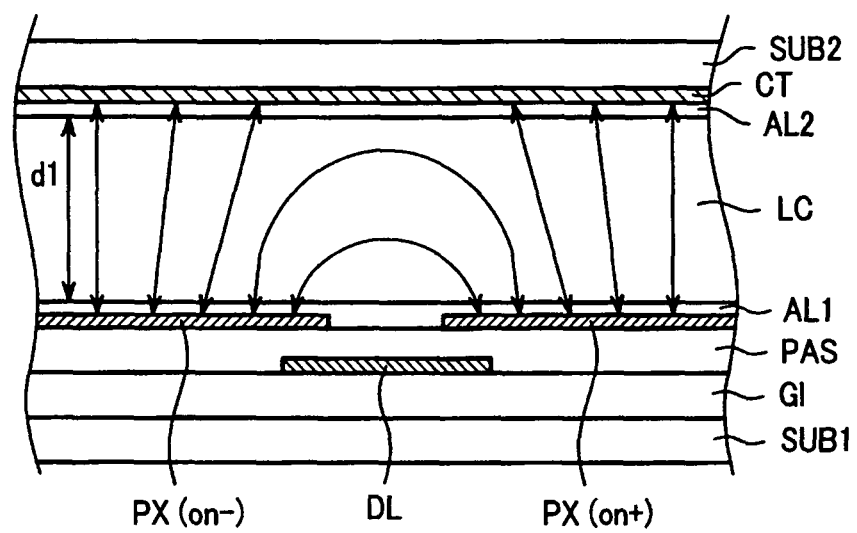
FIGS. 14A and 14B are cross sectional diagrams for explaining a third preferred embodiment according to the present invention.
Figure 14B:
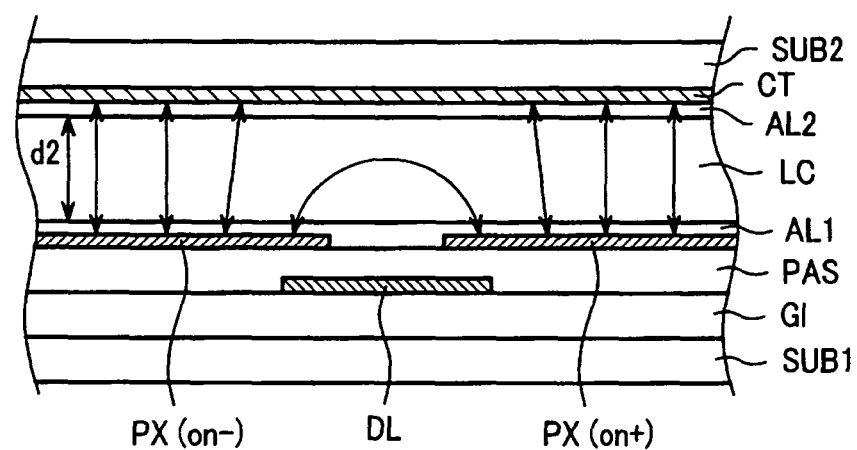

FIGS. 14A and 14B show a relationship, in a configuration of dot inversion driving with the three o'clock viewing angle, between an effect of the horizontal electric field due to a potential difference between pixels and a gap (cell gap) between the first substrate SUB1 and the second substrate SUB2. FIG. 14A shows a case in which the cell gap d is large. As shown in FIG. 14A, when the cell gap d is wide as in the case when the cell gap is d1, the effect of the horizontal electric field is strong and the area in which the liquid crystal molecules are disturbed is also large.

FIG. 14B shows a case in which the cell gap d is small, such as a cell gap d2. In this case, the effect of the horizontal electric field component is weak compared to the vertical electric field component, and the area in which the alignment of the liquid crystal molecules is disturbed is narrow. As a result, the area of the light leakage is also narrow.

Figure 15:
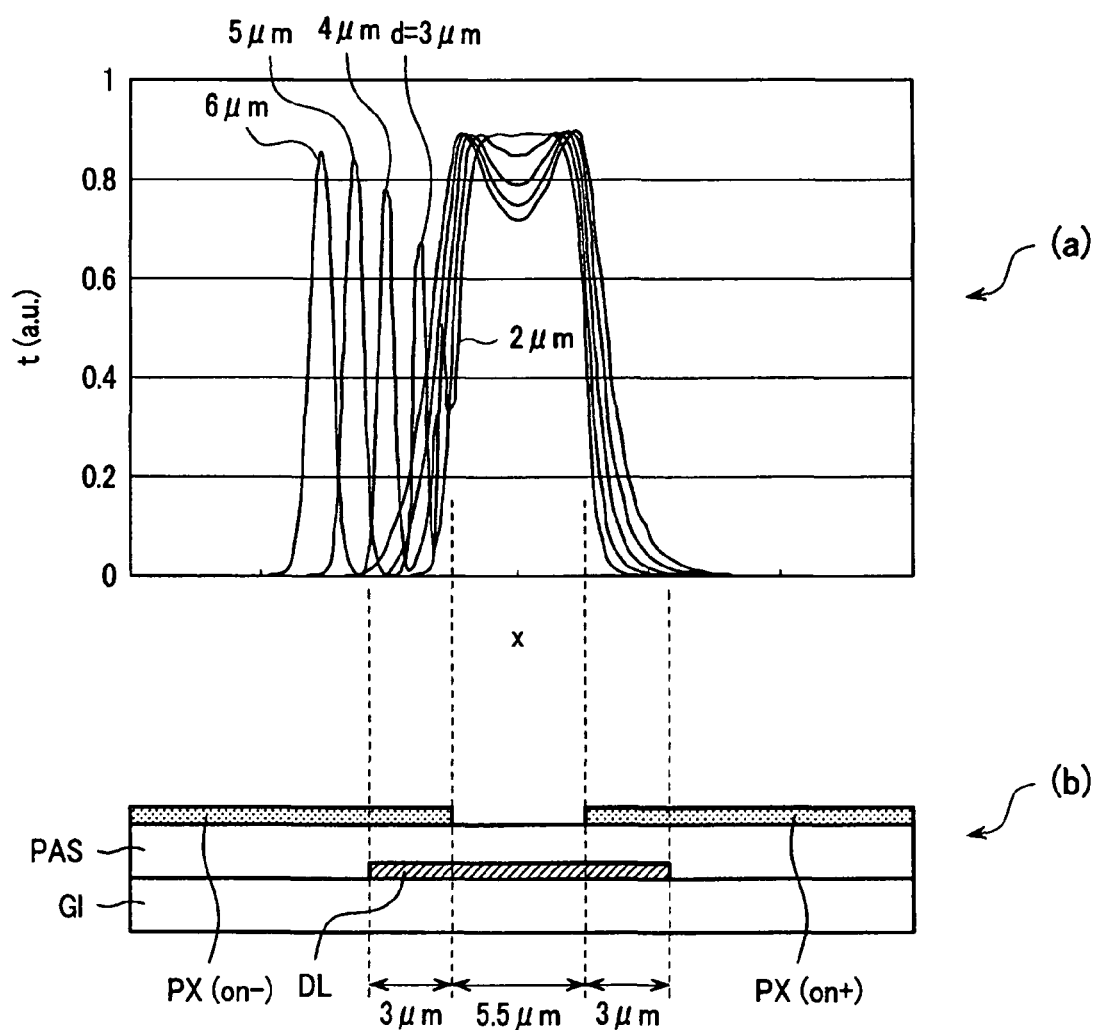
FIG. 15 is a graph showing an advantage of a third preferred embodiment according to the present invention.

FIG. 15 is a graph showing a relationship between the cell gap d and the transmittance of the liquid crystal due to the alignment disturbance. In (a) of FIG. 15, the vertical axis represents a transmittance t of the liquid crystal layer LC due to the alignment disturbance and the horizontal axis x represents a position. The horizontal axis x in (a) is correlated to the positions of the pixel electrode PX and the video signal line DL of the first substrate SUB1 shown in (b).

In (a), when the cell gap d is 6 μm, the area having large transmittance of the liquid crystal layer LC due to the alignment disturbance is very wide. In particular, the disclination line due to the reverse tilt has a large transmittance, and the position of the disclination line exceeds the area which can be light-shielded by the video signal line DL. When, on the other hand, the cell gap d is 2 μm, on the other hand, the transmittance of the liquid crystal layer LC due to the alignment disturbance is small. In addition, the transmittance due to the disclination line by the reverse tilt is also small, and the position of the disclination line is within a range which can be sufficiently light-shielded by the video signal line DL.

Figure 16:
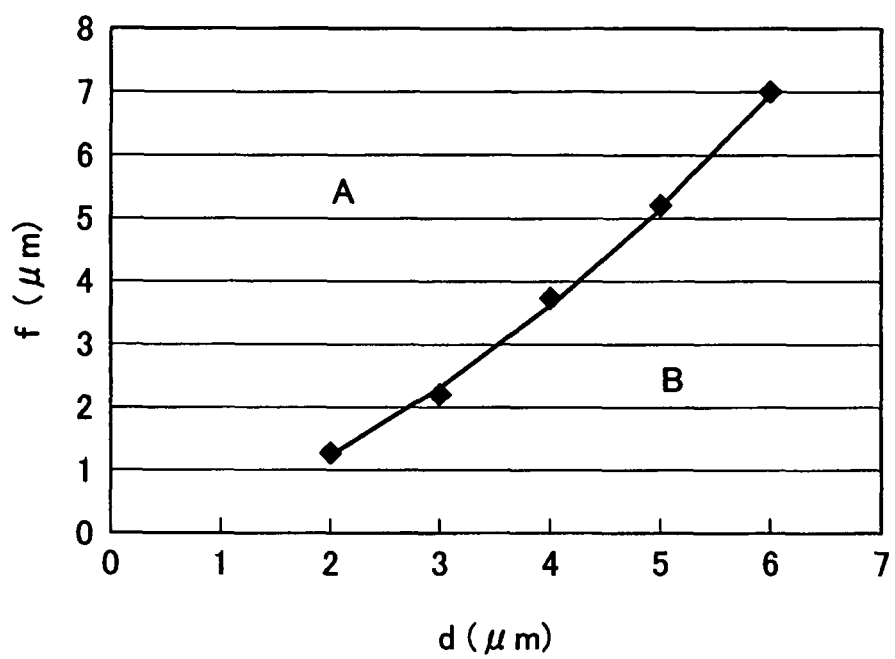
FIG. 16 is a graph summarizing advantages of a third preferred embodiment according to the present invention.

This shows that a width of the overlap between the video signal line DL and the pixel electrode PX can be changed depending on the size of the cell gap d. In other words, when the area of the alignment disturbance is small, the amount of overlap between the video signal line DL and the pixel electrode PX can be reduced and the aperture ratio of the pixel can be increased. FIG. 16 shows this relationship. In FIG. 16, the horizontal axis represents the cell gap d and the vertical axis represents the overlap width f between the pixel electrode PX and the video signal line DL which is necessary for preventing light leakage due to the alignment disturbance. In FIG. 16, a region A represents a region in which the light does not leak and a region B represents a region in which light leaks. As shown in FIG. 16, the necessary amount of overlap between the video signal line DL and the pixel electrode PX can be reduced as the cell gap d is reduced.

The cell gap d is preferably less than or equal to 4 μm. A more preferable range of the cell gap d is greater than or equal to 2 μm and less than or equal to 3.5 μm.

Fourth Preferred Embodiment

Figure 17:
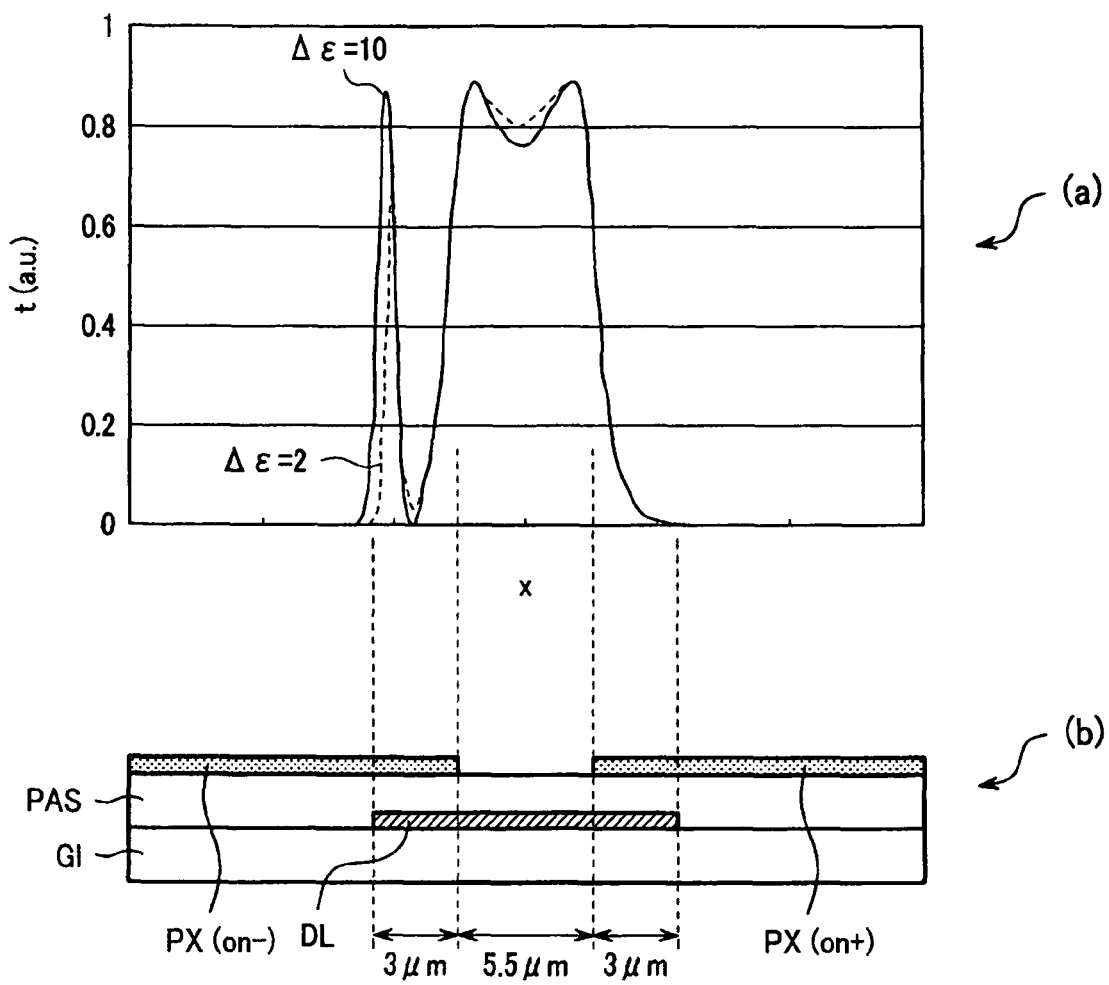
FIG. 17 is a graph showing an advantage of a fourth preferred embodiment according to the present invention.

In the present embodiment, the degree of alignment disturbance by the electric field between pixel electrodes PX in the dot inversion driving with the three o'clock viewing angle is controlled by changing the anisotropy $\Delta \in$ in the dielectric constant of the liquid crystal. FIG. 17 is a graph showing an anisotropy $\Delta \in$ in the dielectric constant of the liquid crystal and the alignment disturbance. In (a) in FIG. 17, the horizontal axis x represents a position and the vertical axis t represents a transmittance of the liquid crystal layer LC. In FIG. 17, (b) shows positions of the pixel electrode PX and the video signal line DL corresponding to (a). The relationship between (a) and (b) is similar to that already described with reference to FIG. 34.

In FIG. 17, (a) shows a representative calculation of the transmittances of the liquid crystal layer LC due to the alignment disturbance in cases where the anisotropy $\Delta \in$ of the dielectric constant is 2 and where the anisotropy $\Delta \in$ of the dielectric constant is 10. As shown in (a), for a larger anisotropy $\Delta \in$ of the dielectric constant, the transmittance of the liquid crystal layer LC due to the alignment disturbance between the pixel electrodes PX is larger and the disclination line due to the reverse tilt exists at an outer position. A reason why the area of the light leakage is narrower for a smaller anisotropy $\Delta \in$ of the dielectric constant of the liquid crystal is because it is harder for the liquid crystal molecules to move with respect to the electric field when the anisotropy $\Delta \in$ of the dielectric constant is smaller. As a result, the area in which the alignment is disturbed becomes narrower and the area of the light leakage becomes narrower.

Figure 18:
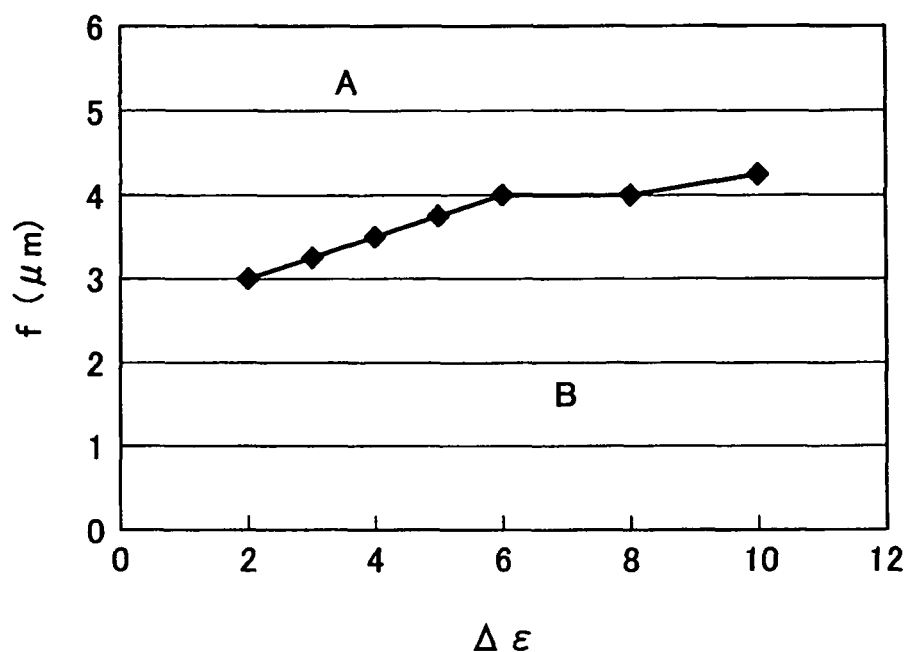
FIG. 18 is a graph summarizing advantages of a fourth preferred embodiment according to the present invention.

Therefore, the amount of overlap between the video signal line DL and the pixel electrode PX which is necessary for preventing the light leakage differs depending on the anisotropy $\Delta \in$ of the dielectric constant of the liquid crystal. FIG. 18 shows a plot of the necessary amount of overlap between the video signal line DL and the pixel electrode PX for various values of Δ∈. In FIG. 18, the horizontal axis represents the anisotropy Δ∈ of the dielectric constant of the liquid crystal and the vertical axis represents the amount f of overlap between the pixel electrode PX and the video signal line DL which is necessary for preventing light leakage. In FIG. 18, a region A represents a region in which light does not leak and a region B represents a region in which the light leaks.

The slope of the plot in FIG. 18 changes at Δ∈=6 as a boundary, and the advantage of reducing the anisotropy Δ∈ on the necessary amount of overlap between the video signal line DL and the pixel electrode PX is significant in the range of Δ∈ of less than or equal to 6. In this manner, when Δ∈ of the liquid crystal is set to less than or equal to 6, the necessary amount of overlap between the video signal line DL and the pixel electrode PX can be reduced and the aperture ratio of the pixel can be increased. Incidentally, a lower limit of the value of Δ∈ is a range of greater than 0.

The first through fourth preferred embodiments may be applied in combination unless the combination is contradictory.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A TN-type liquid crystal display device in which liquid crystal is provided between a first substrate and a second substrate, a rubbing process is applied to the first substrate and the second substrate so that a colorscale inversion does not tend to occur in a three o'clock direction or in a nine o'clock direction, and a dot inversion driving or a column inversion driving is applied, wherein
over the first substrate, video signal lines extend, as a whole, along a first direction which is parallel to a twelve o'clock direction and are arranged in a second direction which is parallel to the three o'clock direction, scan lines extend along the second direction and are arranged in the first direction, and a pixel including a pixel electrode is formed in a region surrounded by the video signal line and the scan line,
the video signal line and the pixel electrode are bent within the pixel, an angle between a side of the bent pixel electrode and the first direction is greater than or equal to 10 degrees and less than or equal to 45 degrees in a clockwise direction on one side of the bent portion and is greater than or equal to 15 degrees and less than or equal to 45 degrees in a counterclockwise direction on the other side of the bent portion when the liquid crystal is twisted in the counterclockwise direction from the second substrate toward the first substrate, and the angle is greater than or equal to 15 degrees and less than or equal to 45 degrees in the clockwise direction on the one side of the bent portion and is greater than or equal to 10 degrees and less than or equal to 45 degrees in the counterclockwise direction on the other side of the bent portion when the liquid crystal is twisted in the clockwise direction from the second substrate toward the first substrate, and
the pixel electrode and the video signal line overlap each other, and an amount of the overlap is larger in the bent portion of the video signal line than in the other portions.

2. The liquid crystal display device according to claim 1, wherein
the angle between the side of the bent pixel electrode and the first direction is greater than or equal to 10 degrees and less than or equal to 25 degrees in the clockwise direction on the one side of the bent portion and is greater than or equal to 15 degrees and less than or equal to 25 degrees in the counterclockwise direction on the other side of the bent portion when the liquid crystal is twisted in the counterclockwise direction from the second substrate toward the first substrate and the angle is greater than or equal to 15 degrees and less than or equal to 25 degrees in the clockwise direction on the one side of the bent portion and is greater than or equal to 10 degrees and less than or equal to 25 degrees in the counterclockwise direction on the other side of the bent portion when the liquid crystal is twisted in the clockwise direction from the second substrate toward the first substrate.

3. A TN-type liquid crystal display device in which liquid crystal is provided between a first substrate and a second substrate, a rubbing process is applied to the first substrate and the second substrate so that a colorscale inversion does not tend to occur in a three o'clock direction or in a nine o'clock direction, and a dot inversion driving or a column inversion driving is applied, wherein
over the first substrate, video signal lines extend, as a whole, along a first direction which is parallel to a twelve o'clock direction and are arranged in a second direction which is parallel to the three o'clock direction, scan lines extend along the second direction and are arranged in the first direction, and a pixel including a pixel electrode is formed in a region surrounded by the video signal line and the scan line, and
the pixel electrode and the video signal line overlap each other, the video signal line and the pixel electrode are tilted within the pixel in a same direction with respect to the first direction, an angle formed by sides of the video signal line and the pixel electrode with the first direction is greater than or equal to 10 degrees and less than 45 degrees in a clockwise direction or is greater than or equal to 15 degrees and less than 45 degrees in a counterclockwise direction when the liquid crystal is twisted in the counterclockwise direction from the second substrate toward the first substrate and the angle is greater than or equal to 15 degrees and less than 45 degrees in the clockwise direction or is greater than or equal to 10 degrees and less than 45 degrees in the counterclockwise direction when the liquid crystal is twisted in the clockwise direction from the second substrate toward the first substrate.

4. The liquid crystal display device according to claim 3, wherein
the angle formed by the sides of the video signal line and the pixel electrode with the first direction is greater than or equal to 10 degrees and less than or equal to 25 degrees in the clockwise direction when the liquid crystal is twisted in the counterclockwise direction from the second substrate toward the first substrate and the angle is greater than or equal to 10 degrees and less than or equal to 25 degrees in the counterclockwise direction when the liquid crystal is twisted in the clockwise direction from the second substrate toward the first substrate.

5. The liquid crystal display device according to claim 3, wherein
the angle formed by the sides of the video signal line and the pixel electrode with the first direction is greater than or equal to 15 degrees and less than or equal to 25 degrees in the counterclockwise direction when the liquid crystal is twisted in the counterclockwise direction from the second substrate toward the first substrate and the angle is greater than or equal to 15 degrees and less than or equal to 25 degrees in the clockwise direction when the liquid crystal is twisted in the clockwise direction from the second substrate toward the first substrate.

6. The liquid display device according to claim 3, wherein the video signal line and the pixel electrode are bent within the pixel, and an amount of the overlap is larger in the bent portion of the video signal line than in the other portions.

\* \* \* \* \*